United States Patent
Cao et al.

(10) Patent No.: US 11,706,213 B2
(45) Date of Patent: Jul. 18, 2023

(54) SYSTEMS AND METHODS FOR FACILITATING NETWORK VOICE AUTHENTICATION

(71) Applicant: MASTERCARD INTERNATIONAL INCORPORATED, Purchase, NY (US)

(72) Inventors: Qing Cao, Purchase, NY (US); Dennis A. Gamiello, Yorktown Heights, NY (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 235 days.

(21) Appl. No.: 16/681,608

(22) Filed: Nov. 12, 2019

(65) Prior Publication Data
US 2020/0153821 A1    May 14, 2020

Related U.S. Application Data

(60) Provisional application No. 62/760,795, filed on Nov. 13, 2018.

(51) Int. Cl.
*H04L 9/40* (2022.01)
*G06Q 20/40* (2012.01)

(52) U.S. Cl.
CPC ..... *H04L 63/0861* (2013.01); *G06Q 20/4016* (2013.01); *G06Q 20/40145* (2013.01)

(58) Field of Classification Search
CPC .............................. H04L 29/06; G06Q 20/40
See application file for complete search history.

(56) References Cited

U.S. PATENT DOCUMENTS

| | | | |
|---|---|---|---|
| 10,554,657 B1 * | 2/2020 | Siddiqui | H04L 63/0861 |
| 2003/0200184 A1 * | 10/2003 | Dominguez | G06Q 20/382 |
| | | | 705/78 |

(Continued)

FOREIGN PATENT DOCUMENTS

| | | |
|---|---|---|
| KR | 10-1541298 B1 | 8/2015 |
| WO | WO2018/111302 | 6/2018 |

OTHER PUBLICATIONS

PCT International Search Report and Written Opinion (11 pages) of PCT Patent Application No. PCT/US2019/060906, dated Mar. 9, 2020. PCT/US2019/060906 has the same priority claim as the instant application.

*Primary Examiner* — Ayal I Sharon
(74) *Attorney, Agent, or Firm* — Harness, Dickey & Pierce, P.L.C.

(57) ABSTRACT

Systems and methods are provided for facilitating voice authentication of a user in connection with a network transaction. One exemplary method includes receiving an authentication request for a transaction, initiated at a voice interactive device, from a merchant plug-in (MPI) associated with a merchant involved in the transaction, where the authentication request includes a pre-authentication indicator based on voice authentication of a user by the voice interactive device or by a voice authentication service. The method also includes generating a risk score for the transaction based at least in part on the pre-authentication indicator, transmitting the risk score with the authentication request for the transaction to an access controller server (ACS) associated with an issuer of an account to which the transaction is directed, and returning a result response to the MPI where the result response indicates permission to proceed in the transaction based on authentication of the user.

13 Claims, 7 Drawing Sheets

(56) References Cited

U.S. PATENT DOCUMENTS

| | | | |
|---|---|---|---|
| 2006/0282660 A1* | 12/2006 | Varghese | G06Q 20/4016 |
| | | | 713/155 |
| 2009/0089869 A1* | 4/2009 | Varghese | G06Q 20/4014 |
| | | | 726/7 |
| 2013/0159194 A1* | 6/2013 | Habib | G06F 21/33 |
| | | | 705/66 |
| 2014/0372128 A1* | 12/2014 | Sheets | G06Q 20/20 |
| | | | 704/273 |
| 2016/0012446 A1 | 1/2016 | Parnell | |
| 2016/0125410 A1* | 5/2016 | Boodaei | G06Q 50/01 |
| | | | 705/75 |
| 2017/0270530 A1* | 9/2017 | Sheets | G10L 17/22 |
| 2017/0337558 A1 | 11/2017 | Corritori | |
| 2018/0089403 A1* | 3/2018 | Watson | G06F 21/45 |
| 2018/0113675 A1 | 4/2018 | Rutherford et al. | |
| 2018/0234464 A1* | 8/2018 | Sim | H04L 9/3213 |
| 2019/0058992 A1* | 2/2019 | Kurian | H04W 12/06 |
| 2020/0044851 A1* | 2/2020 | Everson | H04L 63/0838 |

* cited by examiner

SYSTEMS AND METHODS FOR FACILITATING NETWORK VOICE AUTHENTICATION

CROSS-REFERENCE TO RELATED APPLICATION

This application claims the benefit of, and priority to, U.S. Provisional Application No. 62/760,795 filed on Nov. 13, 2018. The entire disclosure of the above-referenced application is incorporated herein by reference.

FIELD

The present disclosure generally relates to systems and methods for facilitating network authentication of users as part of network transactions (or otherwise), and in particular, to systems and methods for use in facilitating voice authentication of such users in connection with voice interactive devices associated with the users.

BACKGROUND

This section provides background information related to the present disclosure which is not necessarily prior art.

Authentication of users is a common aspect of account usage by the users. In particular, users are known to employ payment accounts with different parties to fund transactions for products at the parties. In connection therewith, the users are known to be authenticated to the accounts through personal identification numbers (PINs), or otherwise, at, for example, point-of-sale (POS) terminals at the parties. Once the users are authenticated, the parties are then permitted or enabled to initiate purchase transactions for the products through the POS terminals, whereby, if approved, the users take possession of the products directly, or through delivery.

It is further known for accounts (such as payment accounts) to be associated with enhanced authentication, such as, for example, 3D Secure authentication, whereby risks associated with transactions involving the accounts are determined in connection with authenticating the users. As part of the enhanced authentication, challenge questions may be posed to the users at their user devices if the risks associated with the transactions are determined to be unsatisfactory. The challenge questions, when employed, may be directed to the users, for example, from access control servers (ACSs) associated with networks or other parties involved in processing and/or approving the transactions. The challenge questions may request static passwords, one-time passwords, fingerprint biometrics, or answers to knowledge-based questions, etc. When the challenge questions are responded to correctly, the risks associated with the transactions are determined to be less, whereby the ACSs may permit the transactions to proceed.

DRAWINGS

The drawings described herein are for illustrative purposes only of selected embodiments and not all possible implementations, and are not intended to limit the scope of the present disclosure.

Figure 1:
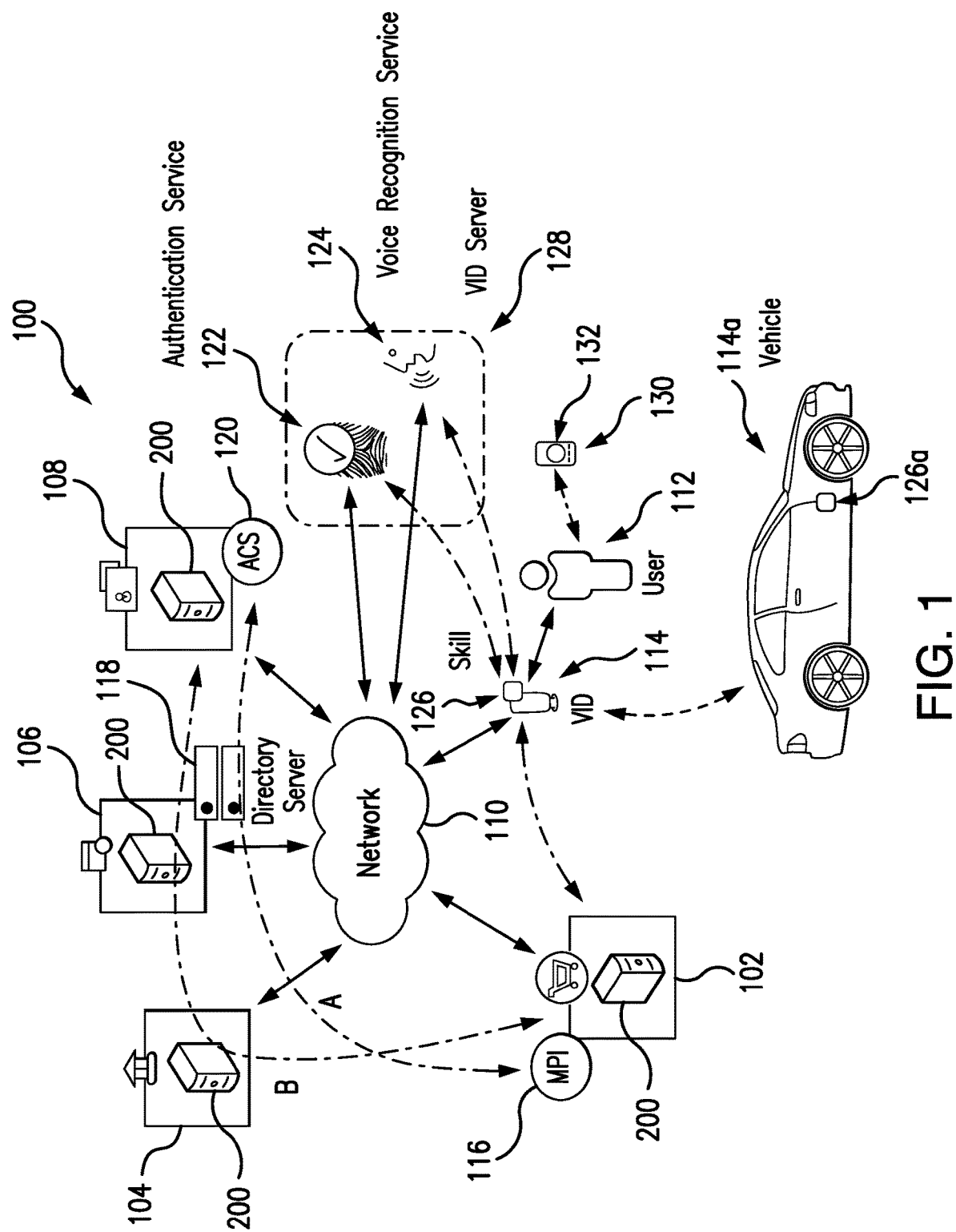
FIG. 1 illustrates an exemplary system of the present disclosure suitable for use in authenticating users in connection with voice interactive devices.
Figure 5:
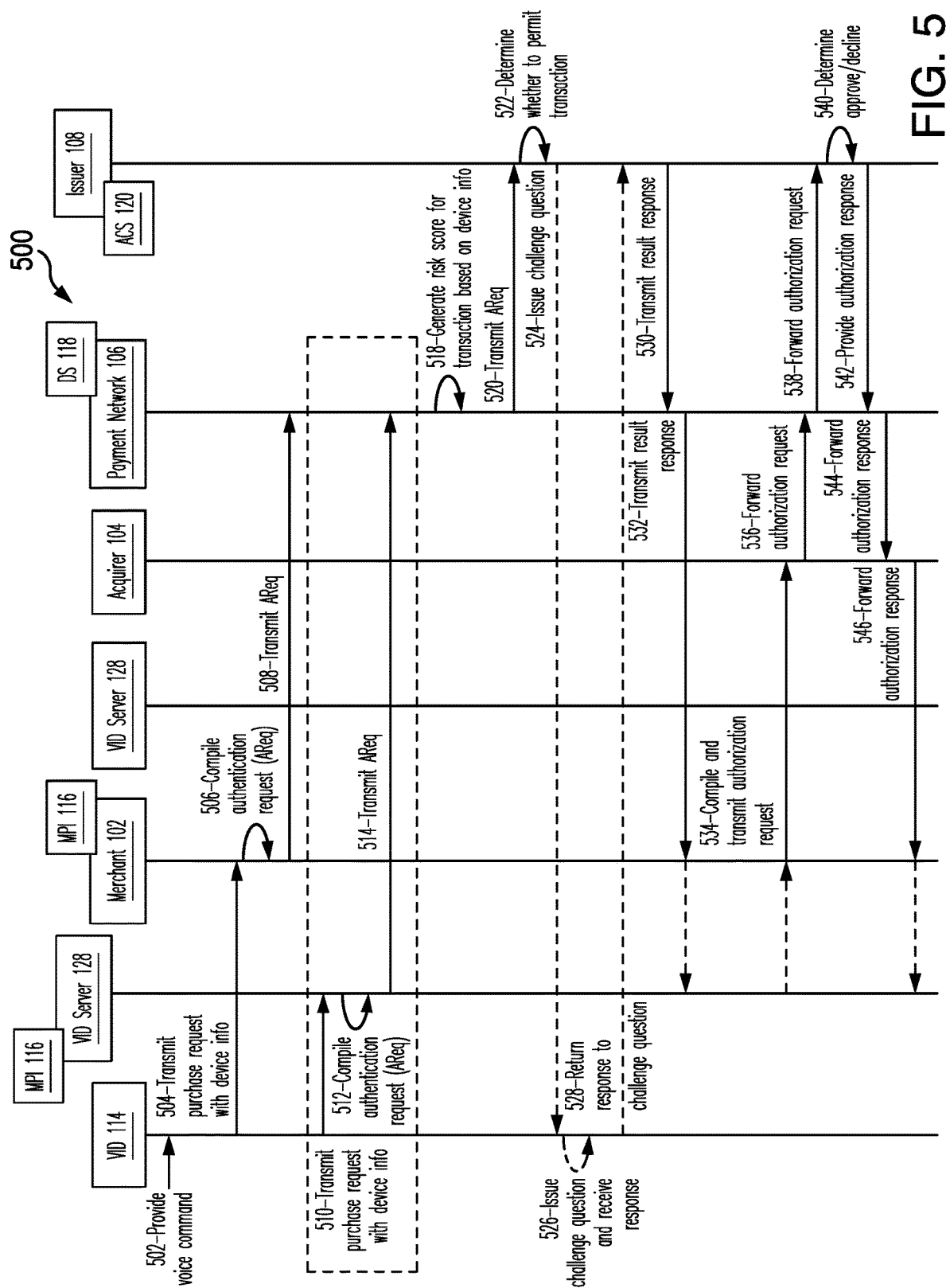
Figure 6:
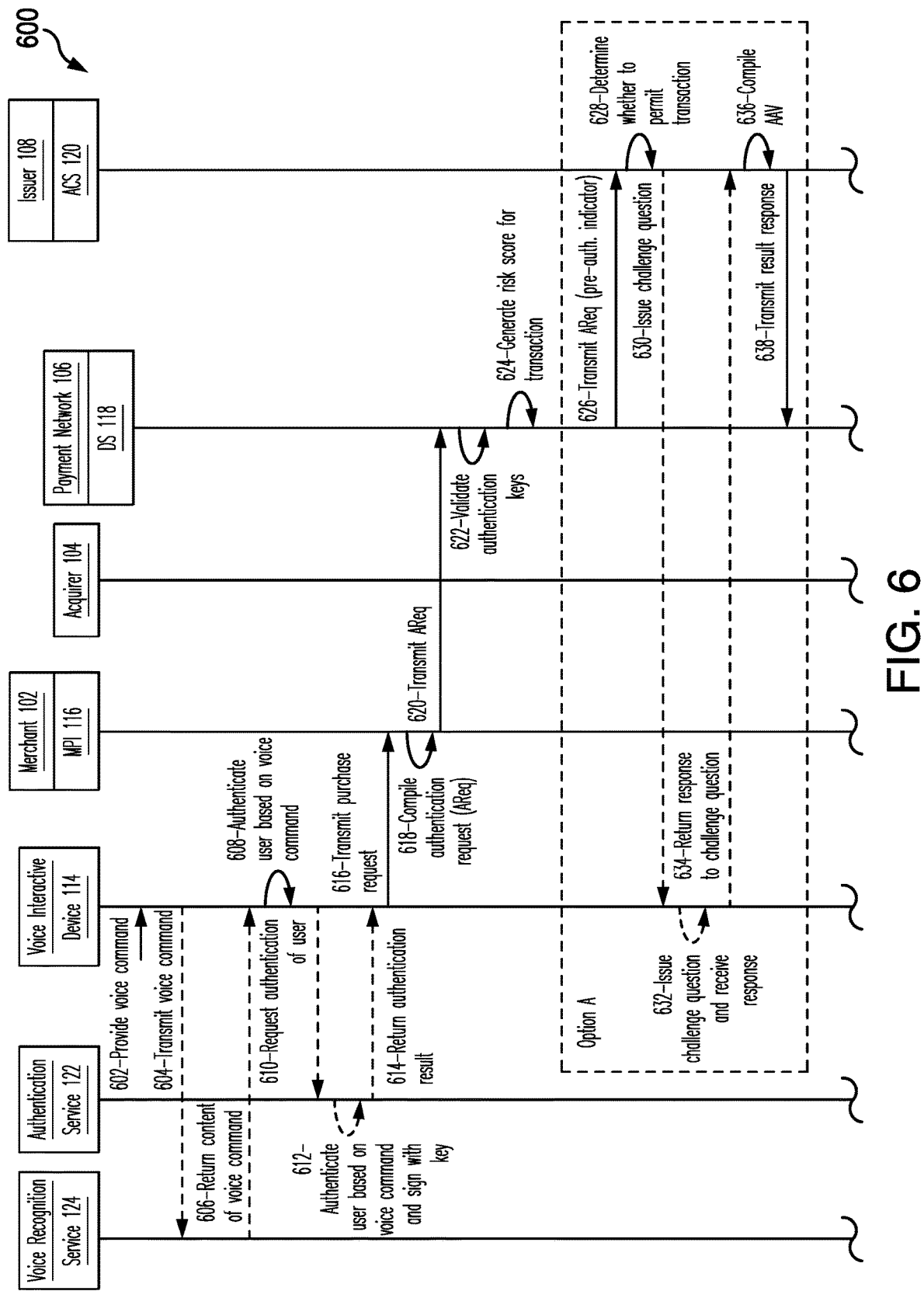
Figure 6:
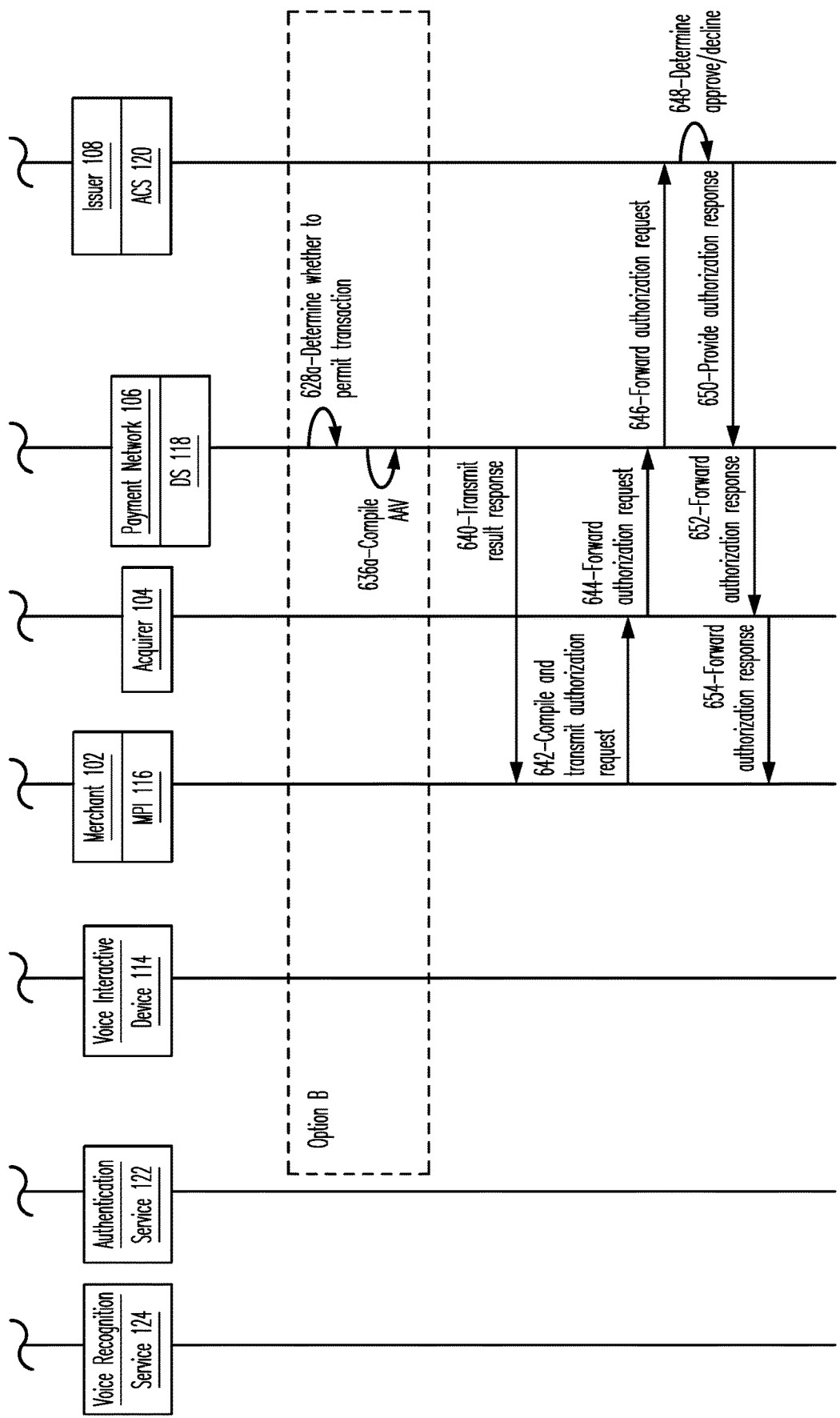

FIG. 5 is an exemplary method, which may be implemented in connection with the system of FIG. 1, for authenticating a user in connection with a voice interactive device through use of device identification information included in an enhanced authentication flow; and FIG. 6 is an exemplary method, which may be implemented in connection with the system of FIG. 1, for authenticating a user, based, at least in part, on a voice biometric as part of enhanced authentication, in connection with network messaging.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users often attempt transactions for the purchase of products from merchants, apart from physical locations of the merchants, i.e., as online transactions at the merchants, which are types of (or which involve) card-not-present transactions. Enhanced authentication may be employed for such transactions, whereupon risk scores for the transactions are determined by access control servers (ACSs) and/or payment networks associated with the transactions. Based on the risk scores, challenge questions may be issued to the users performing the transactions (e.g., at mobile phones or other devices associated with the users, etc.), whereupon the users may be authenticated to payment accounts being used in the transactions. However, these challenge questions create added steps for the transactions and often slow the transaction process, i.e., they create friction during the transaction. What's more, the particular types of information requested in the challenge questions (e.g., passwords, one-time passwords, etc.) may create even further friction and/or frustration for the users, as the users must recall specific passwords or interact with devices to access one-time passwords. And, such friction may cause users to be frustrated and/or seek other or different manners of funding the transactions in order to avoid such enhanced authentication, despite the security benefits associated therewith.

Uniquely, the systems and methods herein facilitate authentication of users in connection with interactions by the users with voice interactive devices (e.g., smart speakers, etc.) based on step-up authentication at communication devices associated with the users, inputs associated with the users (e.g., to applications or skills, etc.), and/or based on voice inputs associated with the users. In particular, when a voice command is provided by a user, as a manner of initiating an interaction, the voice command itself may be used to authenticate the given user. For example, a voice interactive device (VID) (e.g., a smart speaker, a vehicle with a voice interface, or an internet of things (IoT) device with a voice interface, etc.), which receives the voice command for the interaction, may authenticate the user through a voice reference for the user (either directly on the VID, or through a network-based authentication service (e.g., a cloud service, etc.)). As such, when the interaction is directed to a third party, the VID does so with a voice authentication (or score indicative of the same). The voice authentication, then, may be factored into the authentication of the user to potentially avoid a challenge question later in the authentication process for the interaction (e.g., in an enhanced authentication process, etc.). Apart from the voice authentication, the VID, or an associated backend or server, or a third party, may include device information related to the VID in connection with the interaction, thereby providing further information to be factored into the authentication of the user (e.g., a risk score associated with the interaction, etc.). Additionally, or alternatively, the VID may initiate, through an associated backend or server, or a third party, a step up authentication of the user at a communication device associated with the user. Moreover, whether at the VID or otherwise, a challenge question may be utilized as a means for the user to simply speak a phrase, upon which voice authentication of the user may be performed. Consistent with the above, friction associated with the authentication of the user is reduced through use of step-ups to communication devices, device specific information, and/or voice authentication techniques, as opposed to limited authentication of the user and/or the conventional techniques used in enhanced authentication.

What's more, the VID may possess additional information specific to the user, who is initiating the interaction (e.g., speech patterns, speed of speech, pronunciation, accents, driving patterns, seat position, past purchase history/reordering, indications of home WI-FI networks, adjacent devices, etc.). This additional information may be appended to the interaction (e.g., to messaging associated therewith, etc.), whereby it may be used to augment and/or improve the risk score or confidence score associated with the overall authentication of the user in the interaction, or otherwise.

In view of the above, the methods and system herein implement authentication of users in connection with interactions involving the users, through various improved techniques, in connection with voice interactive devices, etc., whereby the interactions may be more secure and may involve less friction than conventional techniques used in enhanced authentication.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, interactions between merchant(s) and/or payment network(s) in the system 100, authentication or enhanced authentication techniques applied in the system 100, purchase devices employed in the system 100, etc.

As shown in FIG. 1, the illustrated system 100 generally includes a merchant 102, an acquirer 104 associated with the merchant 102, a payment network 106, and an issuer 108 configured to issue payment accounts (or other accounts) to users (e.g., consumers, etc.), each of which is coupled to (and is in communication with) network 110. The network 110 may include, without limitation, a local area network (LAN), a wide area network (WAN) (e.g., the Internet, etc.), a mobile network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102 and a user 112 (and/or a voice interactive device (VID) 114 associated with the user 112), etc.

The merchant 102 of the illustrated system 100, in general, offers products (e.g., goods, services, etc.) for sale and/or sells such products to consumers, including the user 112. In this exemplary embodiment, the merchant 102 includes a virtual location, such as, for example, a website, network-enabled application, etc., which permits consumers to initiate and complete purchase transactions for products at the merchant 102 over the network 110, for example, while not physically present at the merchant 102 (or while not physically present at a location of the merchant 102).

In addition in the illustrated system 100, the acquirer 104 is associated with the merchant 102. Specifically, for example, the acquirer 104 has issued an account (e.g., a bank account, etc.) to the merchant 102, into which funds received by the merchant 102 for purchase transactions are deposited. Similarly, the issuer 108 has issued a payment account (e.g., a debit account, a credit account, a prepaid account, etc.) to the user 112, from which funds are debited to pay for purchase transactions with the merchant 102. In connection therewith, the acquirer 104, the payment network 106, and the issuer 108, are configured to cooperate and/or to facilitate a purchase transaction between the user 112 and the merchant 102 and to reconcile funds between the different accounts involved in the transaction, as described below.

What's more, the system 100 is configured to provide one or more authentication or enhanced authentication techniques for purchase transactions involving the user 112, including those performed by the user 112 at the merchant 102 at the virtual merchant location. In particular, as to the later, the system 100 is configured to conform to the EMV 3D Secure™ security protocol for providing enhanced authentication. As such, as shown in FIG. 1, the system 100 further includes a merchant plug-in (MPI) 116, which is incorporated in and/or associated with the merchant 102 (whereby reference to the merchant 102 and the MPI 116 herein may be interchangeable). It should be appreciated that the MPI 116 may be associated otherwise in the system 100, as appropriate. For example, in one embodiment, the MPI 116 may be associated with and/or included in a VID server (or backend) 128 associated with the VID 114, when the VID server 128 is configured as and/or operating at least partially like a merchant, etc. The system 100 also includes a directory server 118, which is incorporated in and/or associated with the payment network 106. The directory server 118 is configured to facilitate messaging associated with the enhanced authentication described herein, and also other operations as described herein. For instance, the directory server 118 may be configured to provide additional services and/or functionalities beyond messaging associated with enhanced authentication, including, for example, artificial intelligence and/or machine learning modules and/or operations for risk scoring, validation modules and/or other operations (e.g., to validate eligibility, to validate protocol, etc.) (e.g., for pre-authentication, etc.), whereby the directory server 118 may refer to multiple computing devices within or associated with the payment network 106, etc. The system 100 further includes an access control server (ACS) 120, which is incorporated in and/or associated with the issuer 108 (whereby reference to the issuer 108 and the ACS 120 herein may be interchangeable).

It should be appreciated that in one or more embodiments, the ACS 120 may be omitted, whereby enhanced authentication may be coordinated between the MPI 116 and the directory server 118, for example, as described in connection with FIG. 6. Relative operation(s) of the MPI 116, the directory server 118, and/or the ACS 120, in connection with the enhanced authentication service included in the system 100, is/are described below.

That said, it should be appreciated that in other embodiments, the system 100 may be configured to conform, in whole or in part, to another standard for providing authentication techniques or enhanced authentication techniques for network interactions (e.g., another version of the 3D Secure™ specification standard (which allows transmission of additional information specific to the user) and/or the Fast Identity Online (FIDO) standard or similar revision thereof to transmit voice authentication results, etc.), which rely on various types of information and/or inputs to authenticate the user 112 in connection with interactions by the user 112 with other entities.

With continued reference to FIG. 1, the VID 114 of the system 100 includes a smart speaker, such as, for example, an Alexa™ or Echo™ smart speaker by Amazon™ or a Google Home™ smart speaker by Google®, etc. The VID 114 includes an audio input device (e.g., a microphone, etc.) and an audio output device (e.g., a speaker, etc.). The VID 114 may further include additional individual LEDs, etc., to visually indicate a status of the VID 114 (e.g., an LED display, etc.) and/or other input devices, such as, for example, push buttons, etc. to allow for interaction with the user 112. That said, in the illustrated embodiment, the VID 114 will generally include a microphone and a speaker as its primary input and output devices, respectively, for interacting with the user 112 through voice commands and audio outputs. In the illustrated embodiment, therefore, the VID 114 generally does not include a display device, whereby images or text data may not be displayed or conveyed to the user 112.

The VID 114 also includes a skill 126 (e.g., an application that runs on the VID 114, alone or in combination with potentially multiple applications; etc.) that configures the VID 114 to interact with the user 112 and/or a third party, as described herein. In general, the skill 126 is a capability of the VID 114, which may be included in an operating system of the VID 114, but is added on top of the operating system to expand the capabilities of the VID 114 and installed after purchase of the VID 114 by the user 112. In various embodiments, for example, the skill 126 is associated with the issuer 108, whereby the skill 126 configures the VID 114 to interact with the issuer 108 with regard to the user's account (e.g., to check a balance, view a payment, view bills, etc.), etc. Additionally, or alternatively, the skill 126 may be associated with the VID server 128, whereby the VID 114 is configured to interact with the VID server 128, as described herein. Other skills may be included at the VID 114, for example, and may be associated with other entities or capabilities, such as mobile telecommunication providers, utilities, other banking institutions, vehicles, smart home retailers, merchants, etc.

The VID server 128 (or VID backend) of the system 100 is associated with the VID 114 and is configured to interact with the VID 114 to perform one or more operations, as described herein. Often, the VID server 128 is associated with a provider or manufacturer of the VID 114 and is disposed away from the VID 114 (e.g., and is configured to connect to hundreds, thousands, or more VIDs, etc.). The VID server 128 is configured to maintain an account for the user 112, whereby interactions between the VID 114 and the user 112 may be associated with the user's account and/or based on information contained in the user's account, as described below. In general, the user 112 registers for the account with the VID server 128 through the VID 114, or through a communication device associated with the user 112 (e.g., communication device 130 via an application included therein, etc.), whereby the VID 114 and/or the VID server 128 is configured to solicit and receive information associated with the registration from the user 112, etc. The account may include (without limitation) a name, billing or shipping addresses, a phone number, an email address, etc., for the user 112. It should be appreciated that while the VID server 128 is illustrated as separate from the merchant 102, in one or more embodiments, the merchant 102 and the VID server 128 may be integrated at least in part (whereby the VID server 128 may be configured to facilitate purchases of products from the merchant 102, etc.). For example, the Alexa™ speaker by Amazon provides the Amazon™ online store through the Alexa™ speaker, whereby the backend for the Alexa™ speaker may then be both a backend, as described, and also a merchant, etc.

In addition, the VID 114 itself is associated with unique device information, such as, for example, a serial number, electronic identification number (EIN), IP address, MAC address, etc., by which the VID 114 may be identified. The unique device information may be included in the account for the VID 114 and stored at the VID server 128 (e.g., including at authentication service 122, etc.), or shared via the skill 126 (e.g., with the merchant 102, the payment network 106, the issuer 108, the authentication service 122, etc.).

In this exemplary embodiment, in connection with the account and/or the skill 126, the VID 114 is also provisioned with a payment account credential (e.g., for the user's payment account issued by the issuer 108, etc.), whereby the VID 114 and/or the skill 126 (e.g., a wallet skill, etc.) includes the credential (e.g., in a secured element, etc.). The payment account credential may include a primary account number (PAN), a token, etc. As such, the VID 114 is configured to provide the payment account credential to the merchant 102, for example, in connection with a transaction by the user 112 (as initiated verbally, for example, via the VID 114 and/or the skill 126).

Further in the system 100, the user 112 is associated with the communication device 130, which may include, for example, a smartphone, a tablet, a laptop, etc. The communication device 130 will often be a portable communication device, but it is not required to be portable in all embodiments. The communication device 130 includes an application 132, which configures the communication device 130 to perform one or more of the operation described herein (e.g., communicate with the VID server 128, etc.). The application 132 may be associated with a party of the system 100, such as, for example, the issuer 108, the payment network 106, the VID server 128, etc. Additionally, the application 132 may include a software development kit (SDK) associated with a network-based authentication service, whereby the application 132 configures the communication device 130 to interact with the network-based authentication service (e.g., the authentication service 122, etc.), as described in more detail below.

In this exemplary embodiment, the VID 114 is configured (e.g., by the skill 126, etc.) to interact with the user 112, based on voice commands from the user 112. For example, the user 112 may issue a command, "Tell me the weather," whereby the VID 114 is configured, by one or more skills, to receive the command, through the microphone, to search, via a network interface therein, one or more network access sites (e.g., backends, etc.) (e.g., via the VID server 128, etc.) to determine the weather at the consumer's location (e.g., via network 110, etc.), and to then audibly provide, via the speaker, the weather to the user 112. It should be appreciated that the VID 114 may be configured, by way of the skill 126 or other skills, to respond to an unlimited number of commands and/or queries, etc. In addition, the VID 114 is configured with network connectivity, through one or more networks, including the network 110, to recognize the commands and/or queries and to allow for such responses.

In the system 100, the VID 114 is disposed at a residence, office, etc., of the user 112 (not shown), whereby the VID 114 is generally accessible to the user 112 (and other users), yet not mobile with the user 112. Other IoT devices, apart from a smart speaker, for example, may be similarly employed as the VID 114 in the residence, office, etc., and also associated with the user 112 in the manner described herein. Conversely, in one or more other embodiments, the VID 114 may be mobile with the user 112. Regardless, through interactions with the user 112, and other users (not shown), potentially, the VID 114 is configured to generate additional information associated with the user 112 and the other users. The information generally includes details about the interactions (e.g., historical interactions, etc.) between the user 112 and the VID 114 (and the other users). For example, a common pattern of commands or queries (e.g., asking to play a specific radio station, adding certain items to a grocery list, etc.), speech patterns, speed of speech, pronunciation, accents, etc., may all be identified to the user 112 and stored as part of the additional information specific to the user 112, wireless networks connected to the VID 114, or wireless devices on the same wireless network of the VID 114, etc.

It should be appreciated that in the system 100 in FIG. 1, the VID 114 may alternatively be a vehicle 114a (as indicated by the dotted lines), such that reference to the VID 114 and vehicle 114a are generally interchangeable herein and such that the description of the VID 114 herein also applies to the vehicle 114a (whereby the vehicle 114a is and/or includes a voice interactive device). Separately, however, the vehicle 114a is further configured, as is conventional, to convey one or more persons from location to location. In connection therewith, the vehicle 114a is configured to enhance the user's experience when traveling in the vehicle 114a. For example, the vehicle 114a may include power seats, a global position system (GPS), a multi-media system, a telephone and/or emergency call system, etc. The vehicle 114a is also configured to provide voice interaction with the user 112, to operate one or more of the systems and/or features of the vehicle 114a. In addition, like the VID 114, the vehicle 114a is configured with network connectivity, through one or more networks, including the network 110. As shown, the vehicle 114a, then, also further includes skill 126a, which configures the vehicle 114a as described herein (in the same or similar manner as skill 126). For example, the skill 126a may bind the vehicle 114a (or unique device information specific to the vehicle 114a) to the user 112 (in a similar manner to the description of the skill 126 in connection with the VID 114).

Again, through repeated interactions with the user 112, and other users (not shown), potentially, the vehicle 114a may be configured to generate additional information specific to the user 112 and the other users. The additional information may include, generally, details about the interactions between the user 112 (and other users) and the vehicle 114a, such as seat positions, mirror positions, common radio stations, driving patterns (e.g., acceleration/braking characteristics, location data, etc.), wireless networks connected to the vehicle 114a, or wireless devices on the same wireless network of the vehicle 114a, etc.

As further shown in FIG. 1, the system 100 includes the network-based authentication service 122 and a network-based voice recognition service 124, each of which is configured to communicate with other parts of system 100 through the network 110. As shown, in this exemplary embodiment, the authentication service 122 and the voice recognition service 124 are included in the VID server 128. However, in other embodiments, the authentication service 122 and/or the voice recognition service 124 may be apart from or separate from the VID server 128. For example, the authentication service 122 and/or the voice recognition service 124 may be included in the VID 114 in one or more embodiments, or more likely, the payment network 106, in various embodiments, whereby the payment network 106 is configured to provide associated services in connection with authentication requests (in connection with an interaction with the VID 114), etc. The requests, then, may be received, when the authentication service 122 is integrated in the payment network 106, or not, for example, via the VID 114 (directly or via the VID server 128) (or the application 132 included in the communication device 130 or otherwise). What's more, the authentication service 122 may include user profiles for a series of users, including, for example, a user profile for the user 112. The user profiles may include a variety of information about the users, and which is usable to authenticate the user (e.g., passcodes, PINs, biometric references, unique device information, etc.). The authentication service 122 may be configured to employ the user profile(s) for the user 112, then, to authenticate the user 112 based on a request (which includes information related to the user 112 attempting to be authenticated and/or to attempting to interact with the VID 114, etc.).

Further, the voice recognition service 124 is configured to interact with the authentication service 122 in connection with one or more requests. In particular, the voice recognition service 124 may be configured by various algorithms to convert a voice sample (as received in the request) into text representative of the words spoken in the voice sample. In at least one embodiment, the voice recognition service 124 is included, at least in part, in the VID 114.

In this exemplary embodiment, the VID 114 is configured, by the skill 126, to communicate with the services 122 and 124, as necessary and/or as described below. For example, during a setup and/or registration of the VID 114 (e.g., with the VID server 128, etc.), the VID 114 is configured to solicit inputs from the user 112 to register the VID 114 to the user 112 and create an account associating and/or binding the user 112 and the VID 114. The voice inputs associated with creating the account are provided to the voice recognition service 124, via the skill 126, which, in turn, is configured to return data indicative of the spoken words in the voice inputs. The VID 114 is then configured to act on the spoken words to facilitate and/or complete registration. Also, the account through which the user 112 is registered is associated with the merchant 102, for example, upon instruction by the user 112, whereby payment account credentials (e.g., provisioned to the merchant 102, provisioned to the VID 114, etc.) are accessible via the VID 114, or are stored in the VID 114, to initiate purchase transactions through the merchant 102.

Further, as part of registering the VID 114 and the user 112 with the VID server 128 (e.g., Amazon™, Google™, GM™, etc.), etc.), for example, the VID 114 is configured to solicit one or multiple voiceprints from the user 112, which are then provided by the user 112 (e.g. by speaking wake words for the VID 114 multiple times, etc.). The VID 114 is configured to store the voiceprints (e.g., as voice templates, etc.) in memory in a secure element (SE) or trusted execution environment (TEE) included therein (e.g., in memory associated therewith, etc.) (i.e., as a voice biometric reference, etc.), whereby the voice is bound to the VID 114. Additionally, or alternatively, the VID 114, in connection with registration, may provide the voiceprints along with a VID identifier specific to the VID 114 and/or user identifier to the VID server 128 (or, potentially, the payment network 106 depending on the authentication service employed) (e.g., to the voice authentication service 122 (which, in turn, is configured to store the voiceprints (e.g., as voice templates, etc.) in memory (i.e., as a voice biometric reference, etc.). In this manner, the authentication service 122 binds the VID 114 (e.g., based on device information, etc.) to the voiceprints, such that only authentication requests associated with the VID 114 may be performed against the stored voice templates, etc. Consequently, the VID 114 may be configured to perform voice authentication (in real time or near real time), locally (e.g., via a low power speech processing chip, etc.) and/or via the network-based authentication service 122 (e.g., as a cloud service, etc.) (e.g., operated by the VID server 128, such as, for example, Amazon™, Google™, GM™ to other provider, etc.).

While only one merchant 102, one acquirer 104, one payment network 106, one issuer 108, two voice interactive devices 114 and 114a, one MPI 116, one directory server 118, one ACS 120, one network-based authentication service 122, one voice recognition service 124, two skills 126 and 126a, one VID server 128, one communication device 130, and one application 132 are illustrated in FIG. 1, it should be appreciated that any number of these parts and/or entities (and their associated components) may be included in the system 100, or may be included as a part of systems, in other embodiments, consistent with the present disclosure. Likewise, it should be appreciated that the system 100 and/or other system embodiments will generally include multiple consumers, each associated with at least one payment account and at least one card device as described herein, etc.

Figure 2:
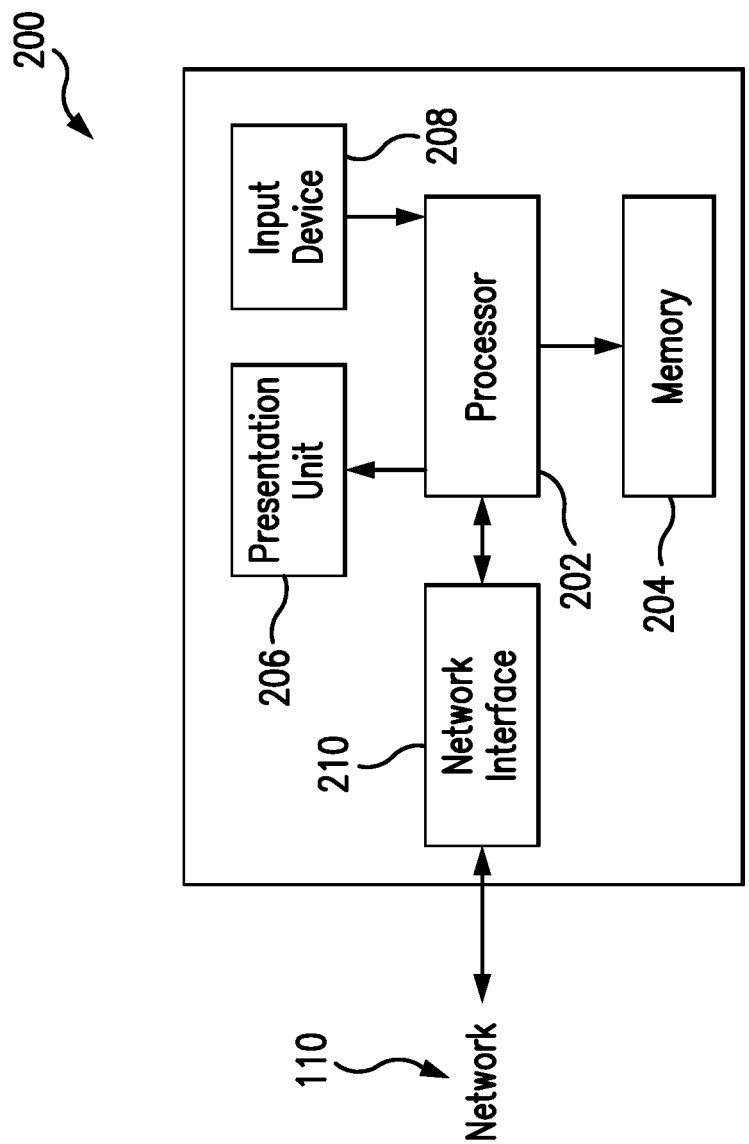
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, virtual reality devices (e.g., headsets, gloves, suits, etc.), etc. In addition, the computing device 200 may include a single computing device, or it may include multiple computing devices located in close proximity or distributed over a geographic region, so long as the computing devices are specifically configured to operate as described herein. In the exemplary embodiment of FIG. 1, each of the merchant 102, the acquirer 104, the payment network 106, and the issuer 108 are illustrated as including, or as being generally implemented in, computing device 200, coupled to (and in communication with) the network 110. In addition, the VID 114 and the vehicle 114a are implemented in and/or at least partly include a computing device consistent with the computing device 200. Further, the MPI 116, the directory server 118, the ACS 120, the network-based authentication service 122, the network-based voice recognition service 124, and the VID server 128 each can also be considered computing devices consistent with computing device 200. However, with that said, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account credentials, user profiles, voice reference data, authentication requests, authentication responses, authentication codes (e.g., accountholder authentication value (AAV) codes or other suitable authentication codes, etc.), voice biometric data, device information, and/or other types of data (and/or data structures) suitable for use as described herein.

Furthermore, in various embodiments, computer-executable instructions may be stored in the memory 204 for execution by the processor 202 to cause the processor 202 to perform one or more of the operations described herein (e.g., one or more of the operations described in method 300, one or more of the operations described in method 400, one or more of the operations described in method 500, one or more of the operations described in method 600, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the instructions effectively transform the computing device 200 into a special purpose device configured to perform the unique and specific operations described herein. It should be appreciated that the memory 204 may include a variety of different memories, each implemented in one or more of the functions or processes described herein.

In the exemplary embodiment, the computing device 200 also includes a presentation unit 206 that is coupled to (and that is in communication with) the processor 202 (however, it should be appreciated that the computing device 200 could include output devices other than the presentation unit 206, etc.). The presentation unit 206 outputs information, such as requests for authenticating information from the user 112, generally, audibly (or potentially, visually), such as via the VID 114 and/or the vehicle 114a, etc. The presentation unit 206 may include, without limitation, a liquid crystal display (LCD), a light-emitting diode (LED) or LED display, an organic LED (OLED) display, an "electronic ink" display, speakers, etc. In some embodiments, presentation unit 206 may include multiple devices.

In addition, the computing device 200 includes an input device 208 that receives inputs from the user of the computing device 200 (i.e., user inputs) such as, for example, voice commands (e.g., at the voice interactive devices 114 and 114a, etc.), etc., as further described below. The input device 208 may include a single input device or multiple input devices. The input device 208 is coupled to (and is in communication with) the processor 202 and may include, for example, one or more of a microphone, a keyboard, a pointing device, location sensors, or any other type of sensor, a touch sensitive panel (e.g., a touch pad or a touch screen, etc.), another computing device, and/or an audio input device, etc. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., WI-FI adapter, a near field communication (NFC) adapter, a Bluetooth adapter, etc.), a mobile network adapter, or other device capable of communicating to one or more different networks, including the network 110. Further, in some exemplary embodiments, the computing device 200 may include the processor 202 and one or more network interfaces incorporated into or with the processor 202.

Referring again to FIG. 1, the VID 114 is configured to participate in an inquiry by the user 112, via the VID 114, related to a third party (e.g., the issuer 108, the merchant 102, etc.), and/or a transfer of funds or purchase transaction by the user 112 to the VID 114, whereby authentication of the user 112 is desired or required.

In particular, when the user 112 decides to submit an inquiry to a third party or to make a purchase through the VID 114, the user 112 provides a command to the VID 114, including, for example, "Speaker, what's the balance of my checking account at Bank A?" or "Speaker, purchase product X from merchant 102." The VID 114 is configured to identify the command based, at least in part, on the salutation (or wake word) "Speaker" and to hold the voice command in memory therein (e.g., the memory 204, etc.). In this exemplary embodiment, the VID 114 is configured, by the skill 126, to transmit the voice command (broadly, an input) to the voice recognition service 124 to determine the content of the command (i.e., recognize the specific words spoken to the VID 114). The voice recognition service 124 is configured to process the voice command and return the content of the voice command in a manner understandable to the VID 114 (e.g., text words, etc.). In this manner, the voice-specific processing included/required in the VID 114 and/or the vehicle 114a may be reduced and/or limited. That said, in one or more embodiments, the voice recognition service 124 may be included in the VID 114, for example, as part of skill 126 to recognize the specific words of the input.

With the command (as recognized by the voice recognition service 124), the VID 114 may be configured in a number of different implementations to fulfill the query or command. In connection therewith, however, for various commands, the VID 114 initially is configured to authenticate the user making the command, i.e., the user 112, in this example.

In an initial implementation, the VID 114 is configured to perform authentication of the user 112 locally (e.g., based on information included in or provisioned to the VID 114 during registration or setup, etc.). As such, the VID 114 is configured to compare the voice used to provide the query or command to the VID 114 to a voice reference stored in the VID 114 and identified to the user 112 (e.g., at setup or registration, etc., and as stored in memory 204; etc.). Thereafter, the VID 114 is configured to proceed in the query or command (e.g., communicate with the issuer 108 using credentials stored at the VID 114 for the user's payment account and determine account information for the user's account, use credentials stored at the VID 114 for the user's payment account to initiate a transaction at the merchant 102, etc.). The VID 114 is configured then to announce, often audibly, the result of the query or command to the user 112.

In another implementation, the skill 126 included in the VID 114 is associated with a party, such as, for example, the issuer 108. As such, in response to the command, the VID 114 is configured, by the skill 126, to request that the issuer 108 authenticate the user 112. The request is associated with identifying information about the user 112, such as, for example, an account number of the account issued by the issuer 108 or other information specific to the user 112 and known to the issuer 108. In response, the issuer 108 is configured to identify the user 112, based on the account number, email address, device information, etc., included in the request and to request an authentication input from the user 112, at the communication device 130 (rather than at the VID 114) (e.g., via the application 132, when provided by the issuer 108 or in association therewith; etc.).

In turn, in this implementation, the communication device 130 is configured (e.g., by the application 132, etc.) to solicit an authentication input from the user 112 and to verify the authentication input once received. The communication device 130 may be configured (e.g., by the application 132, etc.) to verify the authentication input locally (e.g., based on an authentication reference included therein (e.g., a biometric reference, etc.), etc.), or to verify the authentication input with the authentication service 122 (which may be integrated with the VID server 128, or the payment network 106, for example, or otherwise). The verifying party (e.g., the communication device 130 (or application 132), the authentication service 122, etc.) may further sign an authentication result with a key (or otherwise associate a key with the result), when the user 112 is verified. Thereafter, the communication device 130 is configured (e.g., by the application 132, etc.) to transmit the authentication result to the issuer 108. In response, when the user 112 is authenticated, the issuer 108 is configured to verify the signature of the result (based on the key), when signed, to act on the command (e.g., determine account information, initiate a transaction, etc.), and to respond to the VID 114 with a suitable response (e.g., account information, confirmation of transfer, etc.). The VID 114 is configured then to announce, often audibly, the result to the user 112.

In another implementation, the skill 126 in the VID 114 is associated with the VID server 128, or at least associated with the VID server 128 for purposes of authentication. For example, the skill 126 may be associated with the issuer 108, but may rely on the VID server 128 (and the user's account therewith) to perform authentication of the user 112. As such, in response to the command, the VID 114 is configured, by the skill 126, to request that the VID server 128 authenticate the user 112. The request is associated with identifying information about the user 112, such as, for example, an account number of an account at the VID server 128 for the user 112 or other information specific to the user 112 and known to the VID server 128. In response, the VID server 128 is configured to identify the user 112, based on the account number, email address, device information, etc., included in the request and to request an authentication input from the user 112, at the communication device 130 (rather than at the VID 114) (e.g., via the application 132, etc.).

The communication device 130, in turn, is configured (e.g., generally, or by the application 132, etc.) to solicit an authentication input (e.g., a PIN, a passcode, an OTP, etc.) from the user 112 and to verify the authentication input once received. Again, the communication device 130 may be configured (e.g., by the application 132, etc.) to verify the authentication input locally (e.g., based on an authentication reference included therein (e.g., a biometric reference, etc.), etc.), or to verify the authentication input with the authentication service 122 (which may be integrated with the VID server 128, or the payment network 106, for example, or otherwise). The verifying party (e.g., the communication device 130 (or application 132), the authentication service 122, etc.) may further sign an authentication result, when the user 112 is verified (as generally described above). Thereafter, the communication device 130 is configured (e.g., by the application 132, etc.) to send the authentication result to the VID server 128. The VID server 128 is configured to then pass the authentication result back to the VID 114, whereupon the VID 114 is configured to direct the command, along with the authentication result, to the issuer 108 (e.g., when a balance of an account issued by the issuer 108 is requested, etc.) or other party associated with the command from the user 112 and/or the skill 126 (e.g., to the merchant 102 when the command relates to the purchase of a product, etc.).

In response, when the command relates to the user's payment account at the issuer 108, the issuer 108 is configured to verify the signature of the authentication result, when signed, to act on the command (e.g., determine account information, initiate a transaction, etc.), and to respond to the VID 114 with the response (e.g., account information, confirmation of a transfer, etc.). The VID 114 is configured then to announce, often audibly, the result to the user 112.

In yet another implementation, the VID 114 is configured, by the skill 126 (or other skill), to submit a transaction request (or other request) to a merchant 102 (e.g., associated with the skill 126, etc.) or to the VID server 128 (depending on the entity configured to initiate transactions, for example). The merchant 102, for example, in turn, initiates the transaction, based on a payment account credential provisioned to or included at the merchant 102 (e.g., a card-on file, etc.). In particular, the MPI 116 included in the merchant 102 or VID server 128 (when initiating enhanced authentication) is configured to initially transmit an authentication request (AReq), along path A in FIG. 1, to the directory server 118, to authenticate the user 112 to his/her payment account. It is notable that the AReq from the VID 114 includes conventional content related to the transaction (e.g., an amount, a payment account credential, etc.) but also includes device information for the VID 114 such as, for example, an electronic serial number (ESN), an electronic identification number (EIN), an IP address, a MAC address, a type of device, and other merchant defined device information, etc.

Upon receipt of the AReq, the directory server 118 is configured to generate a risk score for the transaction, based on the available information. The information, again, may include the details of the transaction (e.g., the amount, an indication of the merchant 102, a location of the user 112 and/or the merchant 102, etc.), and may also include one or more risk scoring algorithms provided based on learning algorithms (e.g., based on pattern association, etc.) that are either specific to the user 112 or general to multiple users. The available information may further include the device information (e.g., whether the VID 114, as identified by an ESN or a device type, is known to be associated with the account to which the transaction is directed (e.g., as determined from a user profile associated with the user 112, etc.), etc.). And, the risk scoring will be taken into consideration that transaction normal behaviors may be different for the voice interactive type of device as compared to a mobile device (e.g., by using AI and machine learning, etc.). The directory server 118 is configured to then provide the AReq with the risk score to the ACS 120 (along path A) (or alternatively, make a determination as to authentication apart from the ACS 120).

Alternatively in this implementation, the VID 114 may be configured to authenticate the voice command directly or via the authentication service 122 (yet potentially still sending the voice command to the voice recognition service 124). In the prior scenario, the VID 114 is configured to compare the voice command to a voiceprint or voice template stored in a SE or TEE of the VID 114, and when there is a match (e.g., within industry standards, etc.) to generate or sign a key and transmit the key (e.g., signed, etc.) (i.e., as a pre-authentication indicator) to the VID 114. In the later scenario, the VID 114 is configured to provide the voice command and an identifier of the VID 114 and/or the user 112 to the network-based authentication service 122. The authentication service 122 is configured to then retrieve a voice biometric reference (or voice template) for the user 112 from memory (e.g., the memory 204 associated therewith, etc.) (based on the identifier of the VID 114) and to compare the voice command, as provided by the VID 114, to the retrieved voice reference. The authentication service 122 is further configured to determine a score for the comparison, which is indicative of authentication of the user 112 (e.g., whereby the user 112 is authenticated when the score satisfies a threshold, etc.) or not. When the user 112 is authenticated (e.g., based on the comparison, score, threshold, etc.), the authentication service 122 is configured to generate or sign a key and transmit the key (e.g., signed, etc.) (i.e., as a pre-authentication indicator) to the VID 114.

The VID 114, in turn, is configured to compile a transaction request, including the pre-authentication indicator (and potentially, the score), and transmit the request to the merchant 102. If the user 112 is not authenticated, the pre-authentication indicator is omitted from the transaction request (whereby the merchant 102 may apply other forms of authentication), or the transaction is declined by the VID 114.

Next, when the merchant 102 does receive the transaction request from the VID 114, the merchant 102 initiates the transaction based on a payment account credential provisioned to the merchant 102 (e.g., a card-on file in the user's account, etc.). In particular, the MPI 116 associated with the merchant 102 is configured, again, to initially transmit an AReq (along path A in FIG. 1) to the directory server 118, to authenticate the user 112 to his/her payment account (including the indicator or the pre-authentication indicator and/or the score associated therewith, if included in the transaction request to the merchant 102)

Upon receipt of the AReq (as shown in path A in FIG. 1), the directory server 118 is configured to validate the indicator or the pre-authentication indicator (i.e., the signed key) from the VID 114 and/or the authentication service 122. It should be understood that the signed key may be validated based on an exchange between the payment network 106 and the authentication service 122, whereby the directory server 118 receives sufficient information (e.g., a key, etc.) to validate the signed key for the transaction. When the signed key is not validated (or potentially where the AReq does not include the pre-authentication indicator and/or the authentication score), the directory server 118 is configured to respond back to the MPI 116 and/or merchant 102 (and onto the VID 114), whereupon the transaction is halted. However, when the signed key is validated, the directory server 118 is configured to generate a risk score for the transaction, based on the available information. The information may include, without limitation, the validated key, the details of the transaction (e.g., the amount, the indicator of the merchant 102, the location of the user 112 and/or the merchant 102, etc.), the use of the authentication service 122 for pre-authentication (e.g., as compared to a different authentication service, etc.), additional information (e.g., device information, WI-FI networks, speech patterns, driving patterns, devices on the same network, spending patterns, repeated purchases, similar purchases from the same device and/or WI-FI, etc.) (as compared to reference information identified to the user 112), and one or more risk scoring algorithms provided based on learning algorithms (e.g., based on pattern association, etc.) that are either specific to the user 112 or general to multiple users. The directory server 118 is configured to then provide the AReq with the risk score to the ACS 120. Alternatively, when the signed key is validated and/or based on the risk score, the directory server 118 may determine whether to permit the transaction (e.g., determine the user 112 is authenticated, etc.) (e.g., based on business rules, etc.), whereby it is permitted to omit the ACS 120. In this manner, the directory server 118 is configured to respond to the AReq as explained below (e.g., with an AAV or other authentication code, etc.). That is, the issuer 108 may determine for the user 112, for example, in connection with an indicator or a pre-authentication indicator, it is considered as low risk and will pass the authentication off to the directory server 118.

That having been said, regardless of whether the AReq includes the device information for the VID 114, or the indicator or pre-authentication indicator, upon receipt of the AReq with the risk score (e.g., based on the device information, etc.), the ACS 120 is configured to evaluate the risk score and to determine if a challenge question should be directed to the user 112.

In general, here, the ACS 120 is configured to rely on the transaction being pre-authenticated and verified (when present) to permit the transaction. As such, the ACS 120 is configured to return a result response to the directory server 118 (along path A in FIG. 1) (e.g., where the result response includes an authentication code representative of the authentication of the user 112, etc.). The directory server 118, in turn, is configured to then return the result response (from the ACS 120 or as generated at the directory server 118) to the merchant 102 (and specifically, to the MPI 116), again along path A. In connection therewith, the result response may include an authentication code for the purchase transaction, such as, for example, a part of an AAV for the transaction, which is consistent with the 3D Secure specification, etc., indicating the issuer 108 has authenticated the user 112.

When a challenge question is required, the ACS 120 is configured to transmit the challenge question as either an out-of-band step-up (e.g., to the communication device 130 associated with the user 112 and/or associated with the payment account to which the transaction is directed, etc.) or an in-flow or in-band step-up (e.g., to the VID 114, based on an identifier included in the AReq or the communication device 130 or otherwise, etc.). It should also be appreciated that the challenge question may be coordinated back through the directory server 118 and/or directly with the user 112 at the communication device 130 or the VID 114, depending on a particular implementation. It should be further appreciated that in one or more embodiments, the ACS 120 may be configured to pursue a challenge question (either out-of-band or in-band), as described above, even for a pre-authenticated and verified transactions, when other factors indicate a high risk for the transaction (e.g., as indicated by the score, etc.). In still other embodiments, the ACS 120 may be configured to rely on the risk score (e.g., based on the device information being verified, etc.) from the directory server 118 (or its own risk score based on the same or other information) and, essentially, ignore the pre-authenticated and verified designation for the transaction. Regardless, the challenge question could be answered through a one-time password (OTP) or biometrically, for example, at the communication device 130 (e.g., "Text 1 to Confirm or 2 to Decline", etc.) or the VID 114 (e.g., "Speak your PIN," etc.). When the response is provided at the VID 114 (e.g., via the skill 126, etc.), it should be appreciated that the VID 114 may be configured, by the skill 126, to provide the response to the voice recognition service 124 and then provide the result from the voice recognition service 124 back to the ACS 120. In general, when the challenge question is answered correctly, the ACS 120 is configured to designate the user 112 as authenticated, whereupon the ACS 120 is configured to return a result response (including an authentication code, etc.) to the directory server 118 (along path A in FIG. 1), as described above.

It should also be appreciated that when the ACS 120 permits a pre-authenticated and verified transaction, the directory server 118 may be configured to permit future transactions, based on a business rule, which are similarly pre-authenticated and verified, unconditionally or when the corresponding risk score satisfies a threshold without passing the AReq onto the ACS 120. That is, the issuer 108 may become a participant, for the user 112, in the pre-authentication scenario, whereby as long as the transaction is pre-authenticated and verified, it is considered as low risk and will pass the authentication, with no step-up need for a challenge question to the user 112 and/or decision by the ACS 120. It should further be appreciated that various different business rules, like this, may be implemented in the system 100 to account for the different information available to the directory server 118, the ACS 120, etc., in performing the authentication.

What's more, while the risk score is generated by the directory server 118 in the description above, it should also be appreciated that, in at least one implementation, the ACS 120 may be configured to generate the risk score based on the indicator or the pre-authentication indicator, the device information (e.g., ESN, device type, etc.), additional information (e.g., historical transaction, transaction associated with device types, etc.), and/or the user profile for the user 112, rather than relying on the risk score received from the directory server 118.

Then in the above implementation(s), in response to receiving the result response that includes the authentication code (e.g., AAV, etc.) for the purchase transaction (when the transaction is permitted), the merchant 102 (or VID server 128) is configured to compile an authorization request for the transaction, which includes the authentication code, and to transmit the authorization request (in a conventional manner) to the acquirer 104 (along path B in FIG. 1). In turn, the acquirer 104 communicates the authorization request through the payment network 106 (e.g., through Mastercard™, VISA™, Discover™, American Express™, etc.) to the issuer 108. In response to the authorization request, the issuer 108 determines whether the transaction should be approved, for example, based on whether the payment account associated with the user 112 is in good standing and includes sufficient funds and/or credit to cover the transaction.

In addition, the issuer 108 is configured to communicate with the ACS 120 to confirm the authentication code included in the authorization request (from the result response) (and consistent with conventional 3D Secure™ specification operations).

After approving or declining the transaction, the issuer 108 is configured to then compile an authorization reply and to transmit the authorization reply back, along path B, to the merchant 102, via the payment network 106 and the acquirer 104, which (if approved) facilitates completion of the transaction with the user 112 (e.g., by presenting a receipt to the user 112, by delivering the product to the user 112 in a virtual merchant location setting, etc.). And, when approved, the transaction is later cleared and/or settled by and between the payment network 106, the acquirer 104, and the issuer 108, whereby the appropriate accounts are debited and credited.

It should again be appreciated that the vehicle 114a may be configured, consistent with the description for the VID 114 above, and the above implementations, to similarly enable authenticated interactions and/or transactions, which may be consistent with the 3D Secure™ specification operations. Here, the voice command from the user 112 for the purchase of a product from the merchant 102 (or other command for purchase) is provided at the vehicle 114a. The vehicle 114a is configured to then operate substantially consistent with the VID 114, as descried above, in authenticating the user 112 through one of the above implementations.

Figure 3:
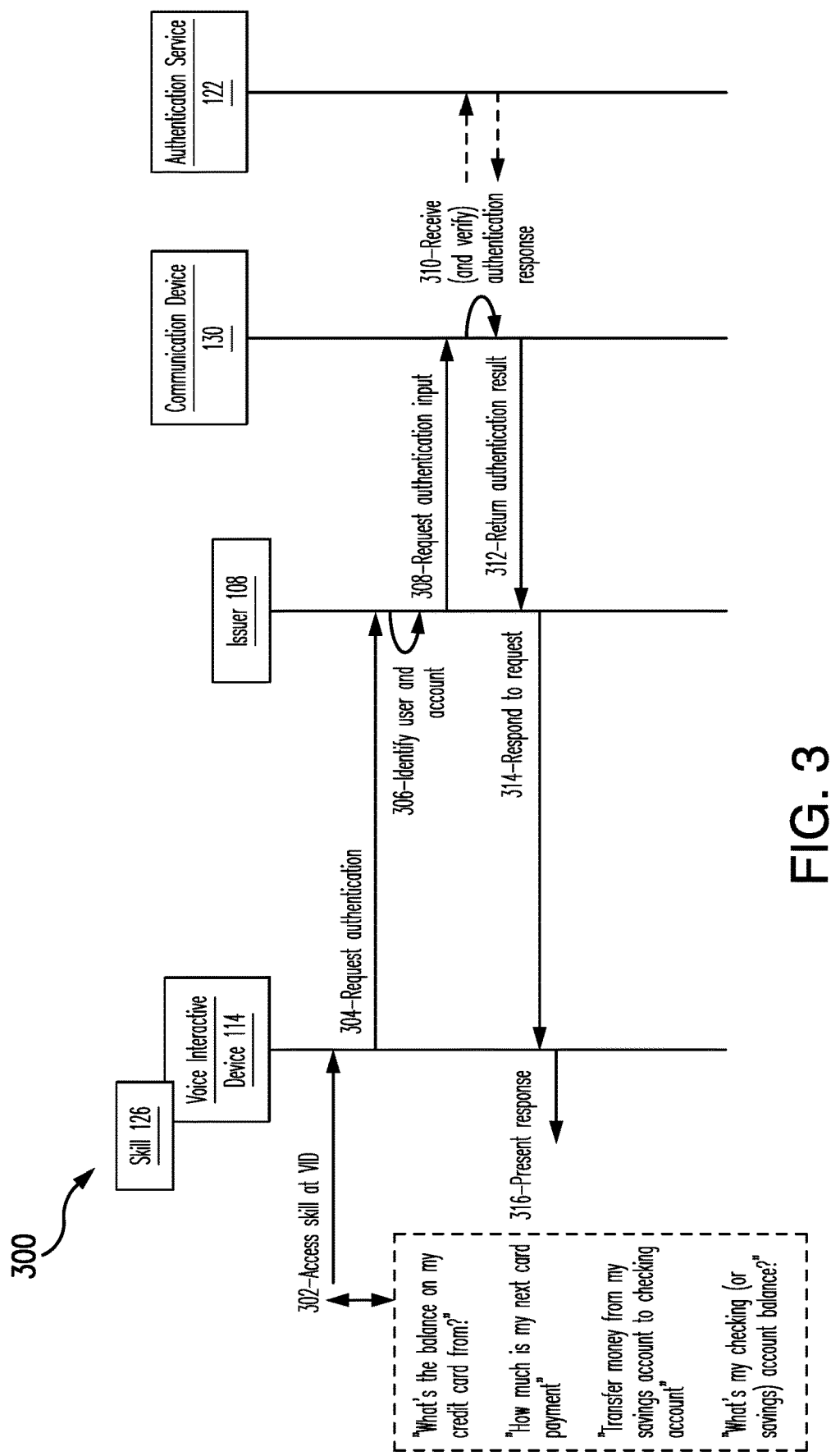
FIG. 3 is an exemplary method, which may be implemented in connection with the system of FIG. 1, for authenticating a user in connection with a voice interactive device through an out-of-band step-up leveraging a communication device associated with the user.

FIG. 3 illustrates an exemplary method 300 for use in authenticating a user, in connection with an interaction by the user with a voice interactive device, through an out-of-band step-up leveraging a communication device associated with the user. The exemplary method 300 is generally described in connection with the user 112, the VID 114, and the ACS 120 of the system 100, and in conjunction with the other parts of the system 100 illustrated in FIG. 1. Further reference is made to the computing device 200 of FIG. 2. That said, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset in the method 300, the user 112 attempts to access the skill 126, at the VID 114, by asking a question, providing a direction or instruction, etc. As explained above, the skill 126 provides a capability of the VID 114, and may, as in the example of method 300, be associated with a party, such as, for example, the issuer 108. The input from the user 112 may include, as shown, a request for the balance of a credit card, or the amount of a next payment, or further a direction to transfer funds, etc. It should be appreciated that the instruction or queries by the user 112 are generally only limited by the skill 126 included in the VID 114 (or other skills therein).

As such, at 302, the user 112 accesses the skill 126, by the instruction or inquiry. It should be understood that the user 112 is associated with an account for the skill 126, whereby a backend for the skill 126, such as, for example, the issuer 108, is permitted to identify the user 112. That is, the user 112 has registered for an account with the backend for the skill 126, such that the skill 126 is linked to the account (e.g., includes an account number, an email contact, a phone number, etc.). In addition, as described above, the user 112 is also associated with an account for the VID 114, whereby the VID server 128 associates the user 112 (and certain information about the user 112) with the VID 114. It should be appreciated that the backend for the skill 126 may include the VID server 128 in some embodiments, whereby the account for the VID 114 and the account for the skill 126 may be the same and/or linked to one another, etc. It should further be appreciated that the account between the user 112 and the backend for the skill 126 and/or the VID server 128 may not be limited to the VID 114, but may be useable for the user 112 to access in other manners (e.g., via a network-based application included in the communication device 130 or a webpage, etc.).

In response to the user's access of the skill 126, the VID 114, as configured by the skill 126, requests, at 304, authentication of the user 112 from the issuer 108 (which is associated with the skill 126). The authentication may be requested only for certain instructions or inquiries, or for all instructions or inquiries depending on the type of the skill 126, etc. The request for authentication may include, for example, an identifier associated with the user 112 or the VID 114, which is indirectly indicative of the user 112. What's more, the instruction or inquiry may be included in the request for authentication.

In response, the issuer 108 identifies the user 112, based on the identifier included in the request, and an account associated with the user 112, at 306, and then requests an authentication input from the user 112 at the communication device 130, at 308. More specifically, the account of the user 112 is associated with certain personal identifying information, such as a device ID of the communication device 130 (e.g., MAC address, phone number, etc.) (or application ID for the application 132 (published by the issuer 108, for example), whereby the issuer 108 is permitted to send an SMS message soliciting an authentication input (e.g., passcode, PIN, etc.), or an instruction to the application 132 to solicit a biometric authentication input (e.g., facial image, fingerprint scan, etc.).

In response, the communication device 130 receives, at 310, an authentication input from the user 112. In connection therewith, the communication device 130 may verify the authentication input, for example, against a reference stored in memory 204 of the communication device 130. For example, the communication device 130 may have been provisioned with a digital identity or otherwise for the user 112, whereby the communication device 130 includes a reference biometric or reference authentication input included in a secure element of the communication device 130 (e.g., in the memory 204, etc.). As such, upon receipt of the authentication input from the user 112, the communication device 130 may verify the authentication input, whereby the biometric or other authentication input is verified locally. Thereafter, the communication device 130 compiles an authentication result, which may be signed, or not, by a key included in the communication device 130 (e.g., included in an SDK of the application 132, etc.). The communication device 130 may then return, at 312, the authentication result to the issuer 108, which may include an indication that the user 112 provided a verified input and/or which may include the authentication input received from the user 112 (e.g., in instances where the communication device 130 does not verify the input, the communication device 130 may simply send the received input as the authentication result; etc.).

Alternatively, rather than the communication device 130 verifying the authentication input or providing the authentication input directly back to the issuer 108, the communication device 130 may optionally (as indicated by the dotted lines) transmit the authentication input to the authentication service 122 (e.g., via an SDK included in the application 132, where the SDK is provided from the authentication service 122, etc.), along with an identification of the user 112 or the communication device 130 (e.g., an application ID, a MAC address, a phone number, an email address, etc.). In response, the authentication service 122 includes an account or profile associated with the user 112, which is identified by the identifier provided from the communication device 130. The authentication service 122 then identifies a reference authentication input for the user 112 (based on the identification) (e.g., a reference biometric, a passcode, etc.) and verifies that the authentication input from the user 112 is a match and/or is correct (e.g., compares the biometric from the user 112 to the reference biometric, etc.). The authentication service 122 then returns the result of the verification to the communication device 130 (e.g., as a signed result, etc.). Upon receipt, the communication device 130 compiles an authentication result, based on the result received from the authentication service 122, and returns, at 312, the authentication result to the issuer 108 (or via its ACS 120).

In response to the authentication result, the issuer 108 realizes the authentication of the user 112 and responds, at 314, to the request from the VID 114. The VID 114, in turn, presents the response to the user 112, at 316. In one example, the issuer 108 may look up a balance of a credit card issued by the issuer 108 and return the balance to the VID 114, whereupon the VID 114 announces the response to the user 112. In another example, the issuer 108 initiates a fund transfer as indicated by the user 112 and responds with an indication of a transfer initiated or complete to the VID 114, which, in turn, announces the status to the user 112. It should be appreciated that various different instructions and/or inquiries may be facilitated through the VID 114, given the associated skill 126, whereby functionality of the VID 114 is extended to interactions with the issuer 108 and/or other institutions, parties, entities, etc., (e.g., which provide a skill for the VID 114, etc.).

Figure 4:
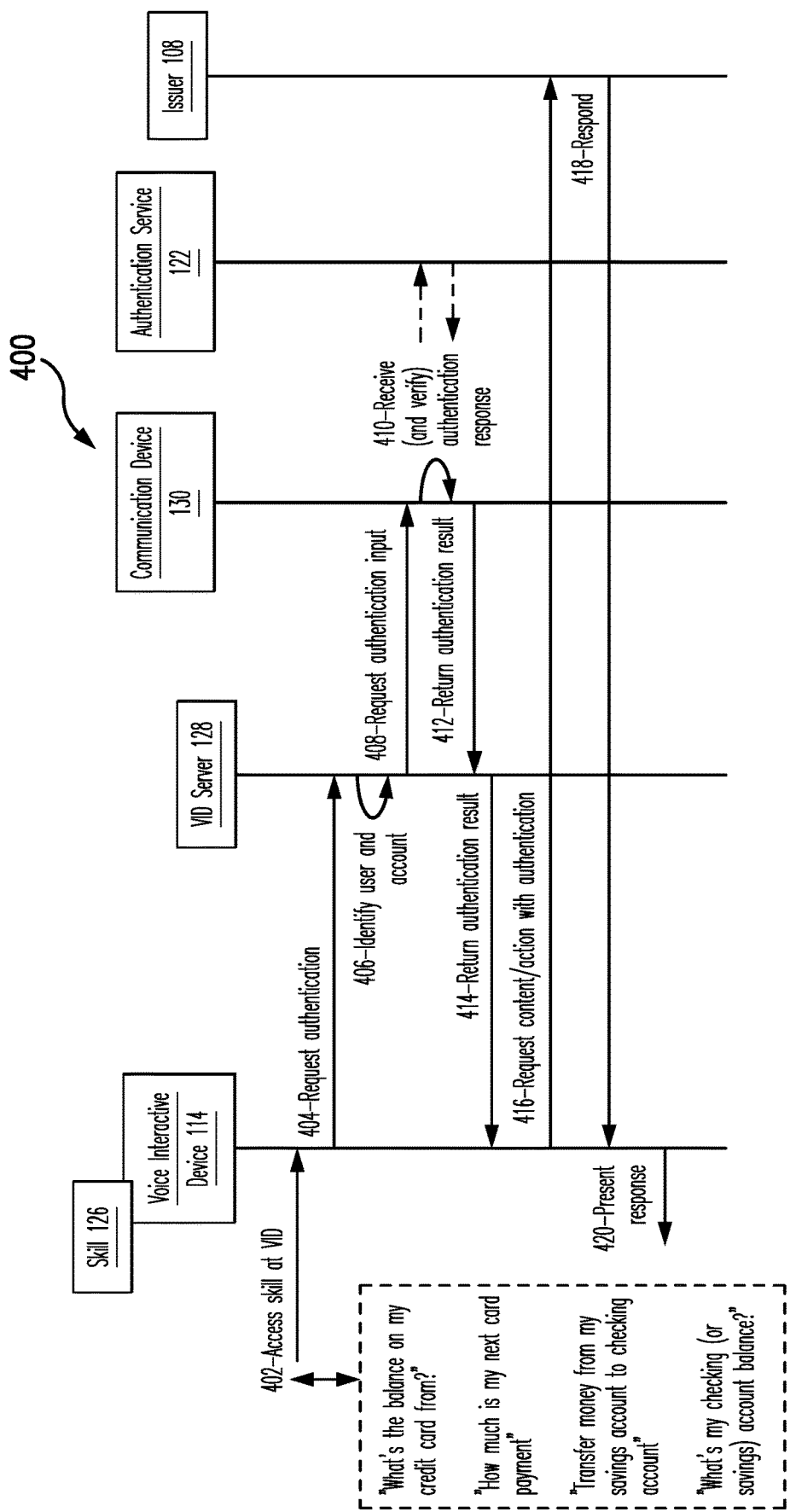
FIG. 4 is an exemplary method, which may be implemented in connection with the system of FIG. 1, for authenticating a user in connection with a voice interactive device through an out-of-band step-up associated with a backend.

FIG. 4 illustrates an exemplary method 400 for use in authenticating a user, again in connection with interaction by the user with a voice interactive device, though an out-of-band step up associated with a VID backend. The exemplary method 400 is generally described in connection with the VID 114 of the system 100, and in conjunction with the other parts of the system 100 illustrated in FIG. 1. Further reference is made to the computing device 200 of FIG. 2. That said, the methods herein should not be understood to be limited to the system 100 or the computing device 200, as the methods may be implemented in other systems and/or computing devices. Likewise, the systems and the computing devices herein should not be understood to be limited to the exemplary method 400.

At the outset in the method 400, (like in the method 300), the user 112 attempts to access, at 402, the skill 126, at the VID 114, by asking a question, providing a direction or instruction, etc. The input from the user 112 may include, as shown, a request for the balance of a credit card, or the amount of a next payment for the credit card, or a direction to transfer funds, etc. It should be understood that the user 112 is associated with an account for the skill 126, whereby a backend for the skill 126, such as, for example, the issuer 108, is permitted to identify the user 112. In addition, as described above, the user 112 is associated with an account for the VID 114, whereby the VID server 128 associates the user 112 (and certain information about the user 112) with the VID 114.

In response to the access of the skill 126, in this exemplary embodiment, the VID 114 requests, at 404, authentication of the user 112, from the VID server 128. The request includes an identifier associated with the user 112 and/or the VID 114 (e.g., an email address, an account number, a phone number, a MAC address, etc.). In response to the request, the VID server 128 identifies, at 406, the user 112, and often, the account associated with the user 112. More specifically, the account of the user 112 is associated with certain personal identifying information, such as a device ID of the communication device 130 (e.g., a MAC address, a phone number, etc.) (or application ID for the application 132 (published by the issuer 108, for example)). Thereafter, the VID server 128 requests, at 408, an authentication input for the user 112, via the communication device 130 (as identified in the account of the user 112). For example, the VID server 128 may send an SMS message soliciting an authentication input (e.g., a passcode, a PIN, etc.), or instructing the application 132 to solicit a biometric authentication input (e.g., a facial image, a fingerprint scan, etc.).

In response, the communication device 130 receives, at 410, an authentication input from the user 112. The communication device 130 may then return, at 412, an authentication result to the VID server 128 including the authentication input (whereby the VID server 128 may then verify the authentication input).

Alternatively, the authentication input may be verified locally at the communication device 130. For example, the communication device 130 may have been provisioned with a digital identity for the user 112 or may otherwise include related data for the user 112 (e.g., via the application 132 or an SDK included therein), whereby the communication device 130 includes a reference biometric or reference authentication input for the user 112 in a secure element of the communication device 130 (e.g., in memory 204, etc.). As such, upon receipt of the authentication input from the user 112, the communication device 130 may verify the authentication input locally (e.g., by comparing the input to the reference, etc.). Thereafter, the communication device 130 may compile an authentication result, which may be signed, or not, by a key included in the communication device 130 (e.g., included in an SDK of the application 132, etc.), and return (at 412) the authentication result to the VID server 128.

Further, rather than providing the authentication input directly back to the VID server 128 or rather than verifying the authentication input locally (or in addition thereto), the communication device 130 may optionally (as indicated by the dotted lines) transmit the authentication input to the authentication service 122 (e.g., via an SDK included in the application 132, where the SDK is provided from the authentication service 122; etc.), along with an identification of the user 112 or the communication device 130 (e.g., an application ID, a MAC address, a phone number, an email address, etc.). The authentication service 122 may be included in the VID server 128, or separate therefrom (e.g., included in the payment network 106, etc.), and includes an account or profile associated with the user 112 (which may be the same as the account identified by the VID server 128 at 406, or not). As such, in response to the authentication input, the authentication service 122 identifies the account associated with the user 112 and then identifies a reference authentication input for the user 112 (e.g., a reference biometric, a passcode, etc.) and verifies that the authentication input from the user 112 is a match and/or is correct (e.g., compares the biometric from the user 112 to the reference biometric, etc.). The authentication service 122 then returns the result of the verification to the communication device 130 (e.g., as a signed result, etc.). Upon receipt, the communication device 130 then compiles the result into an authentication result and returns (at 412) the authentication result to the VID server 128.

Regardless of how the authentication result is compiled, once the VID server 128 receives the result, it returns the authentication result to the VID 114, at 414. The VID 114 then submits, at 416, the original request, from the user 112, via the skill 126 to the issuer 108, for example, as the backend of the skill 126, along with the authentication result from the VID server 128. In response to the request, the issuer 108 or its ACS 120 verifies the result (e.g., based on the signature, the key, etc., applied to the authentication result, etc.) and when verified, responds to the request, at 418. As explained above, in providing the response, the issuer 108 may look up a balance of a credit card issued by the issuer 108 to the user 112 and return the balance to the VID 114, whereupon the VID 114 announces the response to the user 112. In another example, the issuer 108 may initiate a fund transfer as indicated by the user 112 and respond with an indication of a transfer initiated or complete to the VID 114, which, in turn, announces the status to the user 112. Regardless of the response, in general, the VID 114, in turn, presents the response to the user 112, at 420 (e.g., by audibly announcing the balance, by audibly confirming the transfer, etc.).

It should again be appreciated that various different instructions and/or inquiries may be facilitated through the VID 114, given the associated skill 126, whereby functionality of the VID 114 is extended to interactions with the issuer 108 and/or other institutions, parties, entities, etc. (e.g., which provide a skill for the VID 114, etc.), yet based on the authentication by or through the VID server 128 (and/or the authentication service 122).

FIG. 5 illustrates an exemplary method 500 for use in authenticating a user, in connection with interaction by the user 112 with a voice interactive device, through use of device identification information included in an enhanced authentication flow. The exemplary method 500 is generally described in connection with the VID 114 of the system 100, and in conjunction with the other parts of the system 100 illustrated in FIG. 1. Further reference is made to the computing device 200 of FIG. 2. That said, the methods herein should not be understood to be limited to the system 100 or the computing device 200, as the methods may be implemented in other systems and/or computing devices. Likewise, the systems and the computing devices herein should not be understood to be limited to the exemplary method 500.

Again, at the outset in the method 500, the user 112 issues, at 502, a payment or purchase command (broadly, an input) to the VID 114, and specifically, to the skill 126 included therein. That said, while a payment of purchase command is described herein, it should be appreciated that other commands, for example, inquiries, etc., may be employed to initiate method 500.

In response to the command, the VID 114, and specifically, the skill 126, transmits, at 504, a purchase request to the merchant 102 for the purchase of a product (consistent with the command). In this exemplary embodiment, the skill 126 is provided by the merchant 102, whereby the merchant 102 is a backend for the skill 126. As such, the user 112 is associated with an account at the merchant 102, which includes certain data related to the user 112, the VID 114, and, potentially, a payment account credential issued to the user 112 by the issuer 108. Consequently, the purchase request includes at least an identifier associated with the user 112 (e.g., an email address, an account number, a phone number, etc.) and also device information related to the VID 114, such as, for example, an ESN, an EIN, an IP address, a MAC address, or a type of the VID 114 (e.g., smart speaker versus vehicle, etc.), etc. The purchase request may also include an indication of the merchant 102 and an indication of the desired purchase (e.g., the desired product to be purchased, etc.).

Upon receipt of the purchase request, the merchant 102, and specially, the MPI 116, compiles an Areq, at 506, for the transaction (in association with authenticating the user 112 and generally confirming that it is appropriate for him/her to use the payment credentials to initiate the request transaction). And, at 508, the MPI 116 transmits the AReq to the payment network 106, and in particular, the directory server 118.

With that said, an alternate flow for directing the AReq to the payment network 106 (and directory server 118) is shown in the dashed box in FIG. 5. In connection with this alternate flow, the purchase or transfer command is initiated through a skill included in the VID 114 associated with the VID server 128, such as, for example, an account or wallet skill associated therewith (e.g., the Amazon™ online store, Google Express™, etc.), where the user 112 possesses an account with the VID server 128, etc. In connection therewith, upon receipt of the voice command, at 502, the VID 114 transmits, at 510, a purchase request to the VID server 128. As above, the purchase request includes at least an identifier associated with the user 112 (e.g., an email address, an account number, a phone number, etc.) and also device information related to the VID 114, such as, for example, an ESN, an EIN, an IP address, a MAC address, or a type of the VID 114 (e.g., smart speaker versus vehicle, etc.), etc. The purchase request may also include, again, an indication of the merchant 102 and an indication of the desired purchase (e.g., the desired product to be purchased, etc.).

In this flow, the VID server 128 (and specifically, the MPI 116, as included in the VID server 128 in this flow) compiles, at 512, an AReq for the transaction (in association with authenticating the user 112 and generally confirming that it is appropriate for him/her to use the payment credentials to initiate the request transaction). And, at 514, the VID server 128 transmits the AReq to the payment network 106, and in particular, the directory server 118.

Regardless of whether the AReq is from the merchant 102 or the VID server 128, the AReq includes the detail of the transaction or transfer, including, without limitation, an amount of the transaction/transfer, a date/time, a payment account credential (e.g., a token, etc.), merchant data (e.g., a name or ID of the merchant 102, a MCC for the merchant 102, etc.), etc. In addition, the AReq includes the device information related to the VID 114.

Upon receipt of the AReq, the directory server 118 generates a risk score for the transaction, at 518. The risk score, in general, is based on the detail of the transaction (e.g., the merchant ID, the MCC, the transaction amount, the location of the user 112/merchant 102, the device ID, a shipping address, a time when placing the order etc.) and specifically, the device information related to the VID 114, and is based on one or more risk models (e.g., based on learning algorithms associated with patterns for voice payments, etc.). Specifically, the risk score may rely on the association of the VID 114 to the user 112 (whereupon device information related to the VID 114 (e.g., type of device, ESN, MAC address, etc.) is appended to a profile associated with the user 112 (e.g., during registration of the VID 114 and/or a skill included therein and stored in the VID server 128 (e.g., the authentication service 122, etc.), the payment network 106, etc., for comparison, etc.)), and/or historical data relating to transactions or transfers initiated at the VID 114. For example, a risk score, for a given transaction, may be determined based on whether the specific transaction is a transaction commonly performed on the type of the VID 114 (e.g., a smart speaker, etc.) (e.g., more common for laundry detergent to be purchase via a smart speaker, than concert tickets; etc.). Additionally, or alternatively, the risk score may be indicative of a match between the ESN of the VID 114 and an ESN included in the user profile for the user 112 (as provided to and/or stored in the payment network 106 form the VID server 128, or otherwise, etc.). It should be understood that in at least one embodiment, the device information may be relied on by the directory server 118 to determine whether to permit the transaction (rather than generate a risk score) (e.g., where there is a match between the ESN of the VID 114 and an ESN included in the user profile of the user 112, etc.), as in FIG. 6, below.

Once the risk score is generated, the directory server 118 transmits a pre-authentication indicator and risk score along with, and/or included in, the AReq, to the ACS 120, at 520. In general, the device information related to the VID 114, at this stage, indicates that the transaction is associated with the VID 114 or a type of the VID 114 or that it is known to be associated with the payment account to which the transaction or transfer is directed, whereby the risk score reflects that confidence.

The ACS 120 then employs authentication related business rules to determine whether the user is authenticated and/or to permit the transaction to proceed based on the risk score, at 522. For some business rules, the ACS 120 will permit the transaction promptly upon identifying the transaction as being associated with the device information related to the VID 114. The ACS 120 may permit this transaction, in such a manner, so that future like transactions or transfers will be permitted with the ACS 120 (i.e., as a delegation to the directory server 118) (when the risk score satisfies a threshold). Conversely, the ACS 120 may desire to permit transactions, individually, even when the transactions are pre-authenticated and validated.

In any case, after the ACS 120 determines to permit the transaction, or not, the ACS 120 provides a result response to the directory server 118, at 530, which is then forwarded from the directory server 118 to the MPI 116, at 532 (which is either included in the merchant 102 (when the originating transaction request is sent to the merchant 102) or the VID server 128 (when the originating transaction request is sent to the merchant 102), as indicated by the dotted line). When the transaction is permitted and/or the user 112 is authenticated, the result response includes, among other things, an authentication code for the purchase transaction by the user 112 (e.g., as part of an AAV representative of the authentication of the user 112, as is conventional and as is consistent with the 3D Secure specification; etc.). Conversely, when authentication of the user 112 is not successful (e.g., the risk score is unsatisfactory, etc.), the result response, then, may include an indication that the user 112 is not authenticated, whereby the merchant 102 (or VID server 128) is instructed to halt the transaction (or, potentially, require the user 112 to try either the transaction or the authentication again or utilize a different form of payment, or for the merchant 102 to assume the risk, etc.).

It should be appreciated that when the pre-authentication indicator is not included in the AReq, the AReq is passed to the ACS 120 with or without a risk score from the directory server 118 (e.g., at 520, etc.). The ACS 120 may then generate a risk score for the transaction (based at least in part on the device information related to the VID 114, etc.) and then, at 522, determine whether to permit the transaction. If the risk score (as received from the directory server 118, or as generated) is not satisfactory, the ACS 120 may optionally (as indicated by the dotted lines in FIG. 6) issue a challenge question to the user 112, at 524. The challenge question is coordinated directly to the VID 114 (or communication device 130), or back through the directory server 118 and the MPI 116, to the VID 114 (or the communication device 130). For example, the VID 114 may issue the challenge question to the user 112 (e.g., "Please provide your account PIN," etc.) and receive the response from the user 112, at 526. The VID 114 then provides the response back to the ACS 120, at 528, whereupon the ACS 120 may again employ authentication rules to determine whether to permit the transaction based on the response. It should further be noted that the ACS 120 may rely on the content of the response from the user 112 to the challenge question (as determined by the voice recognition service 124, for example), or may, in some embodiments, rely on an authentication of the response itself based on a voice reference (e.g., by the VID 114 and/or the authentication service 122, etc.).

With continued reference to FIG. 5, in response to the result response (indicating authentication), the merchant 102 (or the VID server 128, as indicated by the dotted lines) compiles and transmits an authorization request for the purchase transaction, at 534, to the acquirer 104. The authorization request includes the details of the desired purchase transaction (e.g., a PAN or token for the consumer's payment account, an amount of the transaction, a merchant ID for the merchant 102, etc.) and further includes the authentication code (in the form of the AAV or part thereof) provided from the ACS 120 in the result response. As is conventional, the acquirer 104 forwards the authorization request to the payment network 106, at 536, which, in turn, forwards the authorization request to the issuer 108, at 538. The issuer 108 then determines to approve or decline the purchase transaction, at 540, based on the authentication of the user 112 (or more broadly, presence of the AAV indicating that the user 112 has been authenticated; etc.) and on one or more other factors (e.g., account standing, account balance, available funds, etc.).

Thereafter in the method 500, the issuer 108 compiles and transmits, at 542, an authorization response (or reply) to the payment network 106. The authorization response includes the details of the transaction along with an indicator of whether the transaction is approved or declined. The authorization response is forwarded, in turn, from the payment network 106 to the acquirer 104, at 544, and is then forwarded from the acquirer 104 to the merchant 102, at 546, whereupon the merchant 102 is able to complete the interaction with the user 112.

FIG. 6 illustrates an exemplary method 600 for use in authenticating a user, based at least in part on voice as part of enhanced authentication, in connection with network messaging. The exemplary method 600 is generally described in connection with the user 112, the VID 114, and the ACS 120 of the system 100, and in conjunction with the other parts of the system 100 illustrated in FIG. 1. Further reference is made to the computing device 200 of FIG. 2. That said, the methods herein should not be understood to be limited to the system 100 or the computing device 200, as the methods may be implemented in other systems and/or computing devices. Likewise, the systems and the computing devices herein should not be understood to be limited to the exemplary method 600.

In addition, the method 600 is described with reference to a purchase by the user 112 at a virtual location of the merchant 102, via the VID 114, through a voice command to the VID 114. It should be appreciated that the description of method 600, in the context of this transaction, is for purposes of illustration only and should not be understood to be limiting of the description herein. In addition, it should also be appreciated that the method 600 similarly applies to a purchase by the user 112 at the virtual location of the merchant 102, via the vehicle 114a, through a voice command to the vehicle 114a.

As shown in FIG. 6, when the user 112 decides to initiate the purchase (e.g., for groceries, etc.) from the merchant 102, the user 112 provides, at 602, a voice command to the VID 114, for example, "Speaker, purchase groceries from Merchant 102." It should be appreciated that the voice command may include a command for other transactions as well, such as for example, "Speaker, pay my electric bill," "Speaker, pay by phone bill for this month," or "Reorder my groceries," etc. Further, the voice command may leverage prearranged purchases associated with the user 112 and/or the VID 114. For example, the grocery voice command may be associated with known brand and/or size preferences associated with the user 112 and/or the merchant 102. That said, the particular purchase, product and/or merchant should not be understood as limiting, as long as the voice command is directed to a transaction.

In response to the voice command, the VID 114 captures the voice command and, optionally (as indicated by the broken lines in FIG. 6), via the skill 126, transmits the voice command to the recognition service 124, at 604, and, in turn, the voice recognition service 124 returns, at 606, the content of the voice command to the VID 114 (to determine the content of the voice command).

Further, the VID 114 authenticates the user 112, at 608. Specifically, when the VID 114 includes a voice reference, the VID 114 authenticates the user 112 by retrieving the voice reference from memory (e.g., from a SE or TEE within the memory 204 therein, etc.) and comparing the captured voice command to the voice reference. The VID 114 then determines a score, which is indicative of the match between the voice command and the voice reference. And, the VID 114 compiles a pre-authentication indicator based on the score. In so doing, the score itself may be used as the pre-authentication indicator for inclusion in the transaction request, or the VID 114 may compile the pre-authentication indicator from (or based on) the score (e.g., based on whether the score satisfies one or more thresholds, etc.) As an example, the pre-authentication indicator may be represented as the numerical probability that the captured voice command matches the voice reference (e.g., as "86" indicating an 86% probability of match, etc.), or the pre-authentication indicator may be represented as a 0/1 indicator (e.g., where "1" indicates the probability of match is above 80%, etc.), etc. Regardless, when authentication is determined, the VID 114 signs a key and includes the signed key in the pre-authentication indicator for the transaction. It should be appreciated that the pre-authentication indicator may include any desirable format or information to indicate the relation of the captured voice command and the voice reference.

In one or more embodiments, as part of authenticating the user 112, the VID 114 may provide one or more additional queries to the user 112, related to the voice command or not, to capture additional voice samples for the user 112 (for use in authenticating the user 112). In such embodiments, the additional voice sample(s) may be understood to form part of the voice command in the description herein.

As an alternative in the method 600 (as indicated by the dotted lines in FIG. 6), the VID 114 may request authentication of the voice command, and the user 112, at 610, through the network-based authentication service 122 (instead of doing so locally). In response, the authentication service 122 authenticates the user 112, at 612. Specifically, the authentication service 122 authenticates the user 112 by retrieving the voice reference from memory (e.g., the memory 204 thereof, etc.) and comparing the captured voice command (as received from the VID 114) to the voice reference. And, the authentication service 122 determines a score indicative of the match between the voice command and the voice reference. The authentication service 122 may then, optionally, further generate a key and/or sign or otherwise associate the result of the authentication with a key associated with the transaction (or the authentication service 122, etc.) and return, at 614, a pre-authentication indicator (including or being the signed key) to the VID 114, which includes the signed key and, potentially, the score (as generally described above).

While the authentication service 122 is relied on in method 600, it should be appreciated that the authentication of the voice command may be employed at the VID 114 locally. Specifically, when a voice reference or voice template is bound into the VID 114 at setup or registration, it is stored in the SE or TEE of the VID 114. Then, when the voice command is received, at 602, rather than transmitting the voice command to the authentication service 122, the VID 114 may authenticate the voice command based on the voice template stored therein. And, when the voice command is authenticated, the VID 114 may then generate a key and/or sign or otherwise associate the result of the authentication with a key associated with the transaction (or the VID 114).

Regardless, next in the method 600, at 616 (and regardless of where the user 112 is authenticated), the VID 114 provides a transaction request (or purchase request) to the merchant 102 for the given transaction. As the VID 114 is associated with the user 112, the transaction request is associated with an account of the user 112 at the merchant 102 (e.g., the VID 114 is signed into the user's account with the merchant 102, etc.), whereby the payment account credential for the payment account of the user 112, as provisioned to the merchant 102, is used (e.g., in connection with the user's account at the merchant, etc.). The transaction request includes device data for the VID 114 (e.g., the device ID, device info (device ID, device generation, device name, OS, version, etc.), IP address, home WI-FI network, affiliated devices (i.e., on the same network, etc.) and the pre-authentication indicator and/or authentication key, etc. In addition, in various embodiments, the transaction request further includes the user's payment account credential, when provisioned to the VID 114. In response, because the merchant 102 and/or the user's payment account is associated with enhanced authentication, the merchant 102 passes the transaction request to the MPI 116. In turn, the MPI 116 compiles an AReq for the transaction, at 618, and transmits the AReq to the directory server 118, at 620. The AReq includes, among other things, the pre-authentication indicator (and potentially, the score) for the VID 114 (or for the authentication service 122), etc.

Upon receipt of the AReq, the directory server 118 validates the authentication key, at 622 (when included in the AReq). The validation is completed based on data exchange with the authentication service 122, whereby keys are known to the directory server 118. The directory server 118 decodes and validates the keys (including Metadata included therein), based on one or more business rules associated with the authentication (e.g., white lists of certified authentication providers, white list of keys, etc.). After the authentication key is validated, the directory server 118 generates a risk score for the transaction, at 624. The risk score, in general, is based on the detail of the transaction (e.g., merchant ID, MCC, transaction amount, location, device ID, shipping address, time when placing the order etc.), validation of the pre-authentication indicator (and/or score included in the pre-authentication indicator), and the additional information associated with the user 112 (e.g., WI-FI networks, speech patterns, driving patterns, devices on the same network, spending patterns, repeated purchases, similar purchase from the same device and/or WI-FI, etc.), and/or risk models (e.g., based on learning algorithms associated with patterns for voice payments, etc.).

Once the risk score is generated, the directory server 118 may proceed according to two operational flows. The optional flows are shown in FIG. 6 and designated Option A, which involves the ACS 120, and Option B, which avoids the ACS 120. In Option A, the directory server 118 transmits the pre-authentication indicator and risk score along with and/or included in the AReq, to the ACS 120, at 626. In general, the pre-authentication indicator, at this stage, indicates that the transaction is associated with a pre-authentication indicator (from the VID 114 or the authentication service 122) that has been validated (by the directory server 118).

The ACS 120 will then employ authentication related business rules to determine whether the user 112 is authenticated and/or to permit the transaction based on the risk score, at 628. For some business rules, the ACS 120 will permit the transaction promptly upon identifying the transaction as being pre-authenticated and validated. The ACS 120 may permit this transaction, in such a manner, so that future pre-authenticated and validated transactions will be permitted interaction with the ACS 120 (i.e., delegation to the directory server 118) (when the risk score satisfies a threshold). Conversely, the ACS 120 may desire to permit transactions, individually, even when the transactions are pre-authenticated and validated.

After the ACS 120 determines to permit the transaction, or not, the ACS 120 compiles an AAV (or other suitable code) representative of the authentication of the user 112, at 636, and provides a result response (including the AAV or other suitable code) to the directory server 118, at 638, which is forwarded, from the directory server 118, to the MPI 116, at 640. When the transaction is permitted and/or the user 112 is authenticated, the result response includes, among other things, the authentication code for the purchase transaction by the user 112 (e.g., as part of an AAV representative of the authentication of the user 112, as is conventional and as is consistent with the 3D Secure™ specification; etc.). Conversely, when authentication of the user 112 is not successful (e.g., the risk score is unsatisfactory, etc.), the result response, then, may include an indication that the user 112 is not authenticated, whereby the merchant 102 is instructed to halt the transaction (or, potentially, require the user 112 to try either the transaction or the authentication again or utilize a different form of payment, or for the merchant 102 to assume the risk, etc.).

It should be appreciated that when the pre-authentication indicator and/or the authentication key are not included in the AReq, the AReq is passed to the ACS 120 with or without a risk score from the directory server 118 (e.g., at 626, etc.). When the authentication key is not included and thus not validated, the ACS 120 may generate a risk score for the transaction and then, at 628, determine whether to permit the transaction. If the risk score (as received from the directory server 118, or as generated) is not satisfactory, the ACS 120 may optionally (as indicated by the dotted lines in FIG. 6) issue a challenge question to the user 112, at 630. The challenge question is coordinated directly to the VID 114, or back through the directory server 118 and the MPI 116, to the VID 114. For example, the VID 114 may issue the challenge question to the user 112 (e.g., "Please provide your account PIN," etc.) and receive the response from the user 112, at 632. The VID 114 then provides the response back to the ACS 120, at 634, whereupon the ACS 120 may again employ authentication rules to determine whether to permit the transaction. It should further be noted that the ACS 120 may rely on the content of the response from the user 112 to the challenge question (as determined by the voice recognition service 124, for example), or may, in some embodiments, rely on an authentication of the response itself based on a voice reference (e.g., by the VID 114 and/or the authentication service 122, etc.).

It should also be appreciated that the challenge question may alternatively be directed to a device other than the VID 114, such as, for example, a mobile device (e.g., the communication device 130, etc.) associated with the user's payment account (i.e., an out-of-band step-up). In either instance, when the response is provided, the ACS 120 may then compile and transmit a result response, at 638, to the directory server 118.

In connection with Option B, rather than transmit the risk score to the ACS 120, the directory server 118 determines, at 628a, whether the user 112 is authenticated and/or to permit the transaction based on the risk score. Further, for some business rules, the directory server 118 will permit the transaction promptly upon identifying the transaction as being pre-authenticated and validated (e.g., thereby obviating the need to generate the risk score all and/or to rely on a risk score, etc.). Other business rules may involve the directory server 118 relying on the risk score satisfying a threshold in combination with the validated key for the authentication to permit the transaction to proceed and/or authenticate the user 112. Like above, the directory server 118 may permit this transaction, in such a manner, so that future pre-authenticated and validated transactions will be permitted interactions with the directory server 118 (i.e., delegation to the directory server 118) (when the risk score satisfies a threshold). Conversely, the directory server 118 may desire to permit transactions, individually, even when the transactions are pre-authenticated and validated.

When the directory server 118 determines to permit the transaction, or not, the directory server 118 compiles an AAV (or other suitable code) representative of the authentication of the user 112, at 636a. It should be appreciated that a value other than an AAV may be compiled herein to indicate the result of authentication of the user 112 (e.g., a cardholder authentication verification value or CAVV), etc.).

Regardless of which option is employed, the directory server 118 transmits the result response, at 640, to the MPI 116, where the result includes the AAV for the transaction.

Further, it should be appreciated that, when the ACS 120 permits a pre-authenticated and verified transaction (or otherwise agrees to "delegate" the assessment of the risk to the directory server 118), the directory server 118 may act accordingly. That is, the directory server 118 may permit future transactions (consistent with the VID 114 and the user 112, etc.), which are similarly pre-authenticated and verified, and when a risk score for the given transaction satisfies a threshold (e.g., a low risk transaction, etc.). This is then done without passing an AReq (or, more generally, the transaction) on to the ACS 120 for authentication. Stated more broadly, this permits the ACS 120 and/or the issuer 108 to rely on the authentication service 122 (e.g., operated by Amazon®, Google®, GM® to other provider, etc.) (or the VID 114) and the directory server 118 in connection with user authentication thereby reducing friction associated with authentication of the user 112.

With continued reference to FIG. 6, in response to the result response (indicating authentication), the merchant 102 compiles and transmits an authorization request for the purchase transaction, at 642, to the acquirer 104. The authorization request includes the details of the desired purchase transaction (e.g., a PAN or token for the consumer's payment account, an amount of the transaction, a merchant ID for the merchant 102, etc.) and further includes the authentication code (in the form of the AAV or part thereof) provided from the ACS 120 in the result response. As is conventional, the acquirer 104 forwards the authorization request to the payment network 106, at 644, which, in turn, forwards the authorization request to the issuer 108, at 646. The issuer 108 then determines to approve or decline the purchase transaction, at 648, based on the authentication of the user 112 (or more broadly, presence of the AAV indicating that the user 112 has been authenticated; etc.) and on one or more other factors (e.g., account standing, account balance, available funds, etc.).

Thereafter in the method 600, at 650, the issuer 108 compiles and transmits an authorization response (or reply) to the payment network 106. The authorization response includes the details of the transaction along with an indicator of whether the transaction is approved or declined. The authorization response is forwarded, in turn, from the payment network 106 to the acquirer 104, at 652, and is then forwarded from the acquirer 104 to the merchant 102, at 654, whereupon the merchant 102 is able to complete the interaction with the user 112.

In view of the above, the systems and methods herein permit authentication of users, in connection with network-based transactions and in connection with interactions by the users with voice interactive devices, with limited friction to the underlying transactions and interactions. In several implementations, by utilizing the initial voice commands for the transactions or interactions as a basis to authenticate the users, the risk scores associated with the transactions or interactions may be improved and/or a later request for the users to provide an authenticating input is avoided. In addition, the systems and method herein provide improved resistance to friendly fraud (e.g., a user's son, daughter, acquaintance, etc., attempting transactions, etc.), in that the consumers/users (and not simply an individual knowing the consumer's account PIN or being present in the consumer's vehicle or residence) are required to initiate transactions or other interactions at the voice interactive devices (e.g., the VID 114, the vehicle 114*a*, etc.). Further, it should be appreciated that the systems and methods herein may provide issuers and ACSs with more information about the voice-initiated transactions.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

With that said, example embodiments of the present disclosure generally relate to computer-implemented methods for effecting voice authentication of users in connection with voice interactive devices.

In one such embodiment, an example computer-implemented method for effecting voice authentication of a user in connection with an interaction by the user with a voice interactive device includes receiving, by a voice interactive device, an access request from a user, via a skill included in the voice interactive device specific to a third party, wherein the access request includes a request for information or an instruction for an action; transmitting, by the voice interactive device, the access request to the third party, via the skill included in the voice interactive device, whereby the third party authenticates the user and provides a response to the access request; and presenting, by the voice interactive device, the response to the access request to the user, via a speaker output device of the voice interactive device.

In another embodiment, an example computer-implemented method for effecting voice authentication of a user in connection with an interaction by the user with a voice interactive device includes receiving, by a third party computing device, an access request from the user, via the voice interactive device, wherein the access request includes a request for information or an instruction for an action; transmitting, by the third party computing device, a request for an authentication input from the user, at a communication device associated with the user; receiving, by the third party computing device, an authentication result from the communication device; determining, by the third party computing device, a response to the access request; and transmitting, by the third party computing device, the response to the access request to the voice interactive device, thereby permitting the response to be presented to the user. It should be appreciated that transmitting the request for an authentication input may include identifying the communication device based on a user profile associated with the user and specific to the user and/or the voice interactive device. It should also be appreciated that the third party computing device may include an issuer computing device. Further, it should be appreciated that the third party computing device may include a voice interactive device server, whereby determining a response to the access request includes transmitting the access request to a banking institution and receiving, from the banking institution, the response to the access request. Moreover, it should be appreciated that the example computer-implemented method may also include authenticating, by the communication device, the user via an authentication service.

In still another embodiment, an example computer-implemented method for effecting voice authentication of a user in connection with an interaction by the user with a voice interactive device includes receiving, by a directory server computing device, an authentication request for a transaction initiated, by a user, at a voice interactive device, where the authentication request includes device information for the voice interactive device; generating, by the directory server computing device, a risk score for the transaction based on at least in part of the device information; and after generating the risk score, either: (i) transmitting, by the directory server computing device, the authentication request, with the risk score, to an access control server or (ii) determining, by the directory server computing device, whether to permit the transaction based on the risk score.

Example embodiments of the present disclosure also generally relate to computer-implemented methods for use in facilitating voice authentication of users in connection with network transactions by the users. In one such embodiment, an example computer-implemented method includes receiving, at a computing device, an authentication request for a transaction initiated at a voice interactive device from a merchant plug-in (MPI) associated with a merchant involved in the transaction, the authentication request including a pre-authentication indicator indicative of a comparison of a voice command for the transaction and a voice biometric reference for a user associated with a payment account to which the transaction is directed; validating, by the computing device, the pre-authentication indicator; generating, by the computing device, a risk score for the transaction based at least in part on the pre-authentication indicator and/or additional information associated with the user and/or the voice interactive device; and returning, by the computing device, a result response to the MPI, without interacting with the access control server (ACS) associated with an issuer of the payment account to which the transaction is directed, when the pre-authentication indicator is validated and the risk score satisfies a threshold, whereby the transaction is permitted.

Example embodiments of the present disclosure also generally relate to voice interactive devices comprising, for example, speakers, microphones, and processors coupled to the speakers and the microphones.

In one such embodiment, an example voice interactive device includes a processor configured to capture, via a microphone, a voice command for a transaction from a user; authenticate the user, based on the captured voice command, via an authentication service; and transmit a purchase request for the transaction to a merchant, wherein the purchase request includes a pre-authentication indicator, thereby indicating authentication of the user in connection with the transaction. It should be appreciated that in connection with authenticating the user, the processor may be configured to retrieve a voice biometric reference from a memory associated with the processor; compare the captured voice command to the voice biometric reference; and sign a key associated with the voice interactive device when the captured voice command matches the voice biometric reference. And, in connection therewith, it should be appreciated that the voice biometric reference may be stored in a trusted execution environment or a secure element in the memory. It should also be appreciated that in connection with authenticating the user, the processor may be configured to transmit the captured voice command to a voice authentication service; receive a signed key from the voice authentication service when the captured voice command matches a voice biometric reference for the user; and associate the signed key with the pre-authentication indicator, whereby the pre-authentication indicator includes the signed key. It should further be appreciated that the processor may be further configured to prompt the user, via the speaker, for a response to a challenge question and to return a response from the user to the challenge question to an access control server associated with an issuer of a payment account involved in the transaction and issued to the user; transmit the voice command to a voice recognition service and to receive content of the voice command from the voice recognition service prior to transmitting the purchase request to the merchant; and/or confirm the transaction, via the speaker, when a confirmation of the transaction is received from the merchant. Moreover, it should be appreciated that the voice interactive device may include one of a smart speaker and a vehicle.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations (as generally described and/or claimed herein): (a) receiving, at a computing device, an authentication request for a transaction, initiated at a voice interactive device, from a merchant plug-in (MPI) associated with a merchant involved in the transaction, the authentication request including a pre-authentication indicator based on voice authentication of a user by the voice interactive device or by a voice authentication service; (b) generating, by the computing device, a risk score for the transaction based at least in part on the pre-authentication indicator; (c) transmitting, by the computing device, the risk score with the authentication request for the transaction to an access controller server (ACS) associated with an issuer of an account (e.g., a payment account, etc.) to which the transaction is directed; (d) returning, by the computing device, a result response to the MPI, wherein the result response indicates permission to proceed in the transaction based on authentication of the user; (e) forwarding an authorization request for the transaction to the issuer of the account, after receiving the authorization request for the transaction from an acquirer associated with the merchant; and (f) forwarding an authorization reply for the transaction, received from the acquirer, to the issuer.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations (as generally described and/or claimed herein): (a) receiving, at a directory server computing device, an authentication request for a transaction, initiated at a voice interactive device, from a merchant plug-in (MPI) associated with a merchant involved in the transaction, the authentication request including a pre-authentication indicator based on voice authentication of a user by the voice interactive device or by a voice authentication service; (b) generating, by the directory server computing device, a risk score for the transaction based at least in part on the pre-authentication indicator; (c) determining, by the directory server computing device, to permit the transaction based on the generated risk score, without interacting with an access controller server (ACS) associated with an issuer of an account involved in the transaction; (d) returning, by the directory server computing device, a result response to the MPI, wherein the result response indicates a permission to proceed in the transaction; and (e) validating an authentication key included in the pre-authentication indicator prior to generating the risk score.

As will further be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations (as generally described and/or claimed herein): (a) capturing, by a voice interactive device, a voice command for a transaction from the user, the voice command directed to a third party (e.g., a merchant, etc.); (b) determining content of the voice command; (c) authenticating the user based on the captured voice command and a voice biometric reference associated with a device ID for the voice interactive device; and (c) transmitting, by the voice interactive device, a purchase request for the transaction to the third party, the purchase request including an indication of biometric authentication for the user, whereby the third party is permitted to initiate an enhanced authentication of the user in connection with the transaction.

As will still further be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations (as generally described and/or claimed herein): (a) receiving, at a computing device, an authentication request for a transaction initiated at a voice interactive device from a merchant plug-in (MPI) associated with a merchant involved in the transaction, the authentication request including a pre-authentication indicator indicative of a comparison of a voice command for the transaction and a voice biometric reference for a user associated with a payment account to which the transaction is directed; (b) validating, by the computing device, the pre-authentication indicator; (c) generating, by the computing device, a risk score for the transaction based at least in part on the pre-authentication indicator and/or additional information associated with the user and/or the voice interactive device; and (d) returning, by the computing device, a result response to the MPI, without interacting with the access control server (ACS) associated with an issuer of the payment account to which the transaction is directed, when the pre-authentication indicator is validated and the risk score satisfies a threshold, whereby the transaction is permitted.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art, that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating voice authentication of a user in connection with a network transaction, the method comprising:

prior to receiving an authorization request for a transaction:

receiving, at a computing device, an authentication request for the transaction, initiated at a voice interactive device, from a merchant plug-in (MPI) included at a merchant involved in the transaction, the authentication request including a type of the voice interactive device and a pre-authentication indicator based on voice authentication of a user by the voice interactive device or by a voice authentication service;

generating, by the computing device, a risk score for the transaction based at least in part on the type of the voice interactive device and the pre-authentication indicator;

transmitting, by the computing device, the risk score with the authentication request for the transaction to an access controller server (ACS) associated with an issuer of an account to which the transaction is directed; and returning, by the computing device, a result response to the MPI, wherein the result response indicates permission to proceed in the transaction based on authentication of the user, the result response including an authentication code; and then, receiving the authorization request for the transaction from an acquirer associated with the merchant, the authorization request including the authentication code representative of the voice authentication of the user; and forwarding the authorization request to the issuer of the account.

2. The computer-implemented method of claim 1, wherein the pre-authentication indicator includes a key signed by the voice interactive device or the voice authentication service; and wherein the method further comprises validating the signed key prior to transmitting the risk score to the ACS.

3. The computer-implemented method of claim 1, wherein the pre-authentication indicator includes a score; and wherein generating the risk score includes generating the risk score based on the score associated with the pre-authentication indicator.

4. The computer-implemented method of claim 1, wherein the authentication request further includes additional information indicative of the voice interactive device; and wherein generating the risk score includes generating the risk score based further on the additional information.

5. The computer-implemented method of claim 1, wherein the voice interactive device includes a smart speaker.

6. The computer-implemented method of claim 1, further comprising:

forwarding an authorization reply, to the authorization request, to the acquirer.

7. A computer-implemented method for use in facilitating voice authentication of a user in connection with a network transaction, the method comprising:

prior to receiving an authorization request for a transaction:

receiving, at a directory server computing device, an authentication request for the transaction, initiated at a voice interactive device, from a merchant plug-in (MPI) included at a merchant involved in the transaction, the authentication request including a pre-authentication indicator based on voice authentication of a user for the transaction;

generating, by the directory server computing device, a risk score for the transaction based at least in part on the pre-authentication indicator;

determining, by the directory server computing device, whether to permit the transaction based on the generated risk score, without interacting with an access controller server (ACS) associated with an issuer of an account involved in the transaction; and returning, by the directory server computing device, a result response to the MPI, wherein the result response indicates a permission to proceed in the transaction, the result response including an authentication code for the voice authentication of the user; and receiving, by a payment network computing device, from the merchant, the authorization request for the transaction, the authorization request including the authentication code for the voice authentication of the user.

8. The computer-implemented method of claim 7, further comprising validating an authentication key included in the pre-authentication indicator prior to generating the risk score; and wherein generating the risk score is based on whether the authentication key is validated or not.

9. The computer-implemented method of claim 8, further comprising generating the authentication code for the transaction.

10. The computer-implemented method of claim 7, wherein the voice interactive device includes a smart speaker.

11. The computer-implemented method of claim 7, wherein the authentication request includes information indicative of a type of the voice interactive device; and wherein generating the risk score includes generating the risk score based on the type of the voice interactive device.

12. The computer-implemented method of claim 7, wherein the pre-authentication indicator is based on the voice authentication of the user by the voice interactive device or by a voice authentication service.

13. The computer-implemented method of claim 7, wherein receiving, by the payment network computing device, from the merchant, the authorization request for the transaction includes receiving, by the payment network computing device, from the merchant, through an acquirer associated with the merchant, the authorization request for the transaction.

* * * * *